US012699254B2

(12) United States Patent
Goldenberg et al.

(10) Patent No.: US 12,699,254 B2
(45) Date of Patent: Aug. 4, 2026

(54) SLIM POP-OUT WIDE CAMERA LENSES AND POP-OUT CAMERA ACTUATORS

(71) Applicant: Corephotonics Ltd., Tel Aviv (IL)

(72) Inventors: Ephraim Goldenberg, Tel Aviv (IL); Michael Dror, Tel Aviv (IL); Yiftah Kowal, Tel Aviv (IL); Oriel Grushka, Tel Aviv (IL); Itamar Boral, Tel Aviv (IL); Nadav Goulinski, Tel Aviv (IL)

(73) Assignee: Corephotonics Ltd., Tel Aviv (IL)

( * ) Notice: Subject to any disclaimer, the term of this patent is extended or adjusted under 35 U.S.C. 154(b) by 0 days.

(21) Appl. No.: 19/424,607

(22) Filed: Dec. 18, 2025

(65) Prior Publication Data

US 2026/0153710 A1     Jun. 4, 2026

Related U.S. Application Data

(63) Continuation of application No. 19/117,048, filed as application No. PCT/IB2023/061327 on Nov. 9, 2023, now Pat. No. 12,566,319.

(60) Provisional application No. 63/518,110, filed on Aug. 8, 2023, provisional application No. 63/507,108, filed on Jun. 9, 2023, provisional application No. 63/495,148, filed on Apr. 10, 2023, provisional application No. 63/492,538, filed on Mar. 28, 2023, provisional application No. 63/383,721, filed on Nov. 15, 2022.

(51) Int. Cl.
| | |
|---|---|
| *G02B 13/00* | (2006.01) |
| *G02B 9/64* | (2006.01) |
| *H04M 1/02* | (2006.01) |

(52) U.S. Cl.
CPC ........... *G02B 13/0045* (2013.01); *G02B 9/64* (2013.01); *H04M 1/0264* (2013.01); *H04M 2250/52* (2013.01)

(58) Field of Classification Search
CPC .............................. G02B 13/0045; G02B 9/64
See application file for complete search history.

(56) References Cited

U.S. PATENT DOCUMENTS

2022/0004085 A1 *  1/2022  Shabtay ................. G02B 7/021

FOREIGN PATENT DOCUMENTS

TW          202235945 A       9/2022

OTHER PUBLICATIONS

Office Action in related TW Application 114129839 dated Dec. 30, 2025.

* cited by examiner

*Primary Examiner* — Joseph P Martinez
(74) *Attorney, Agent, or Firm* — Menachem Nathan; Nathan & Associates

(57)     ABSTRACT

Passive pop-out cameras for incorporation in foldable mobile electronic devices such as smartphones, lens systems for such cameras, and pop-out actuators, in some examples passive and in some examples based on shape memory alloys, for actuating the lens systems and other components in such cameras.

19 Claims, 16 Drawing Sheets

100
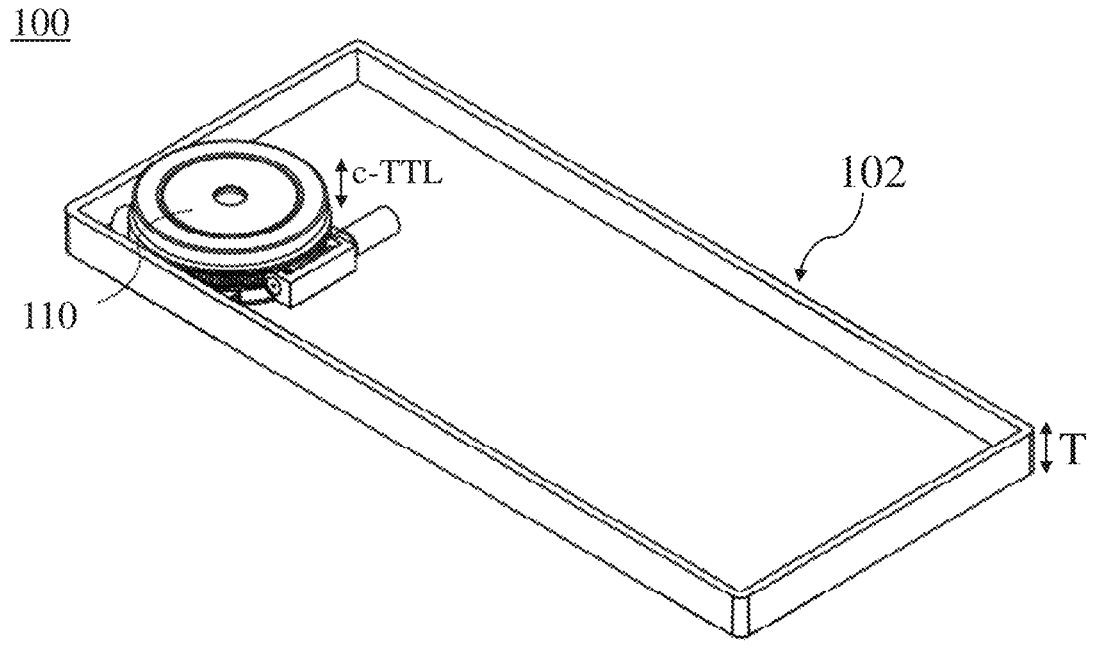
FIG. 1C       KNOWN ART
100
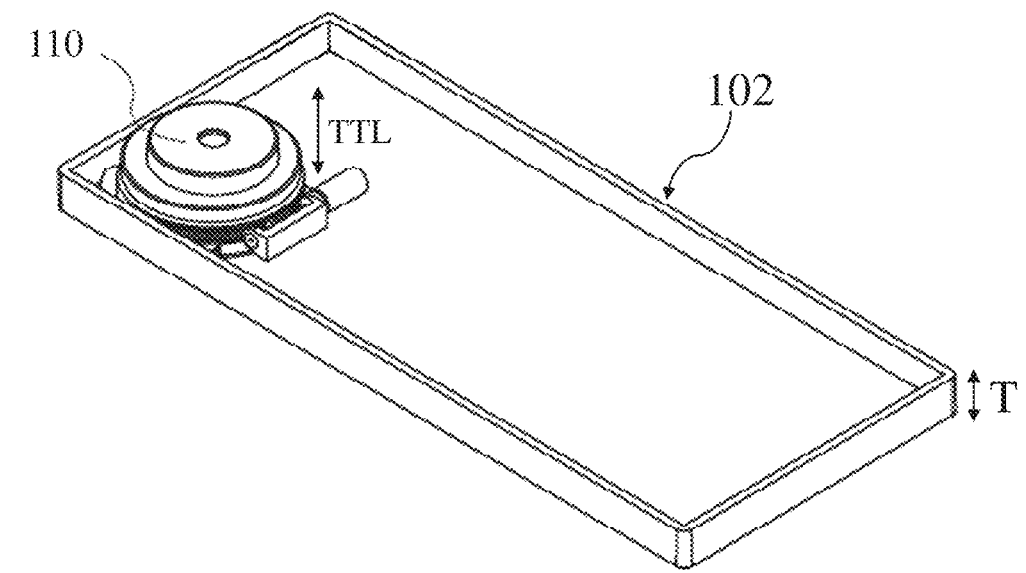
FIG. 1D       KNOWN ART

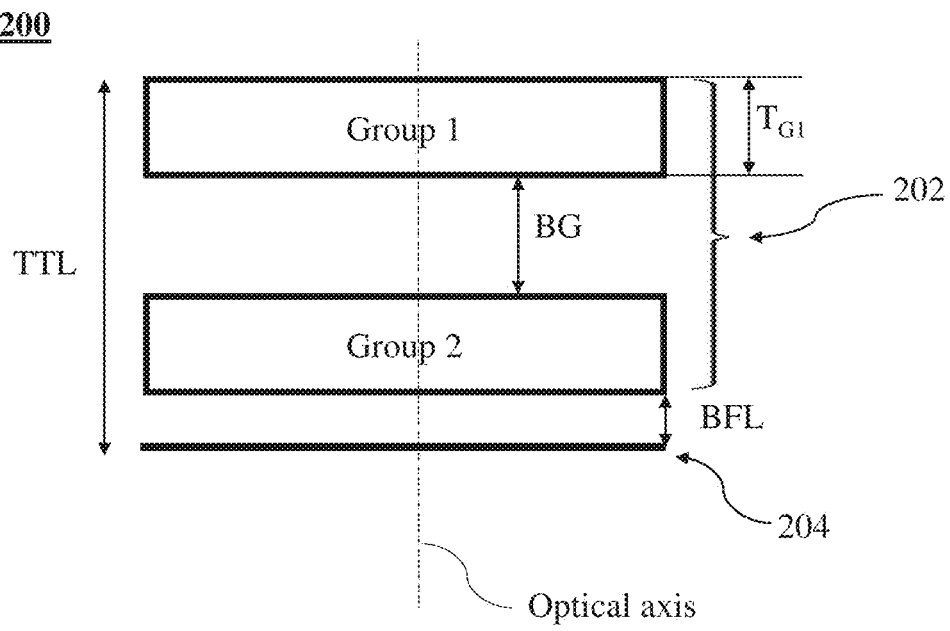
FIG. 2A    KNOWN ART
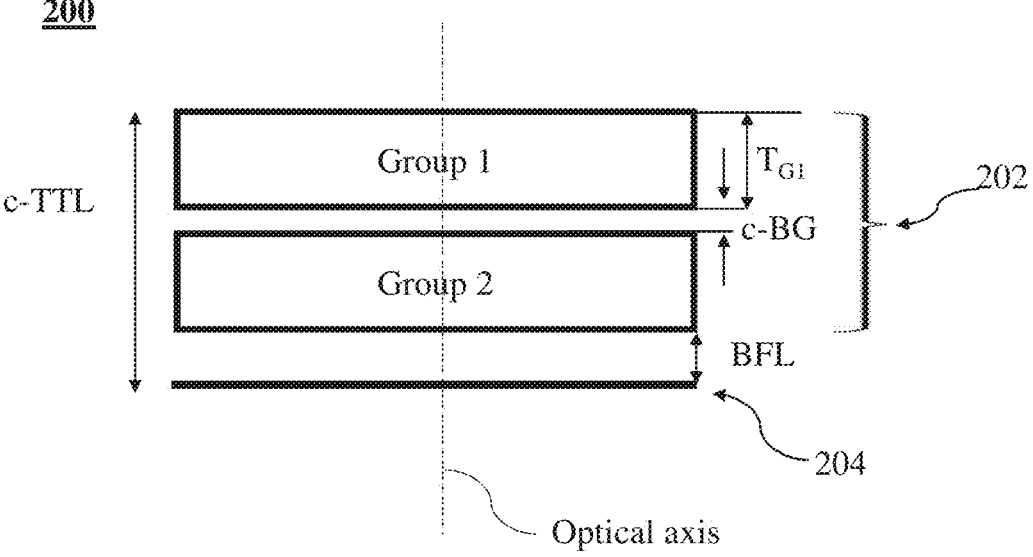
FIG. 2B    KNOWN ART

250
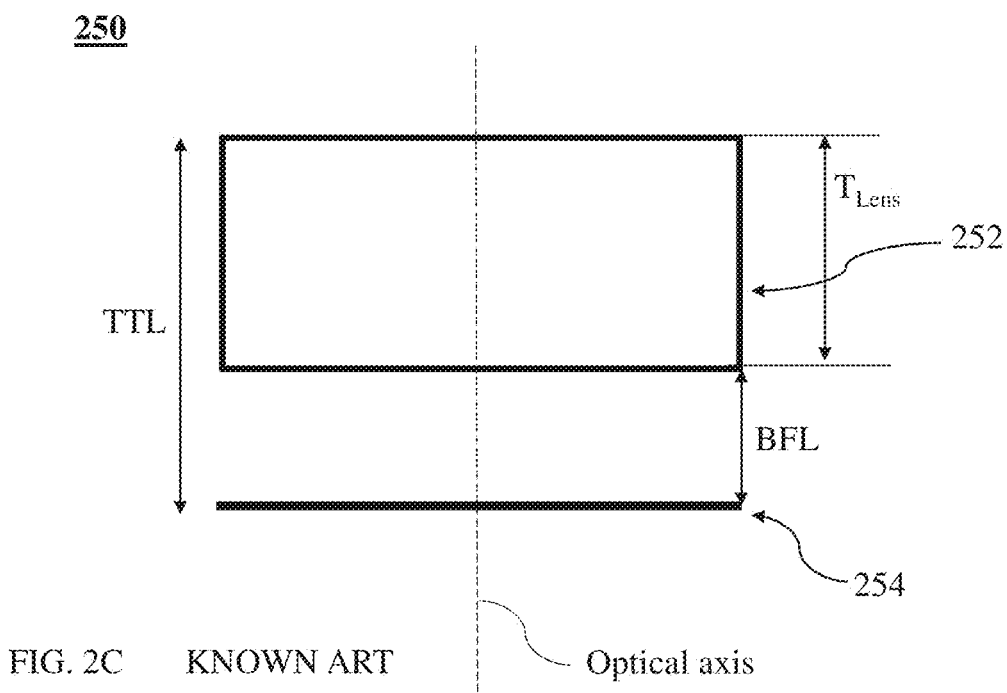
FIG. 2C      KNOWN ART
250
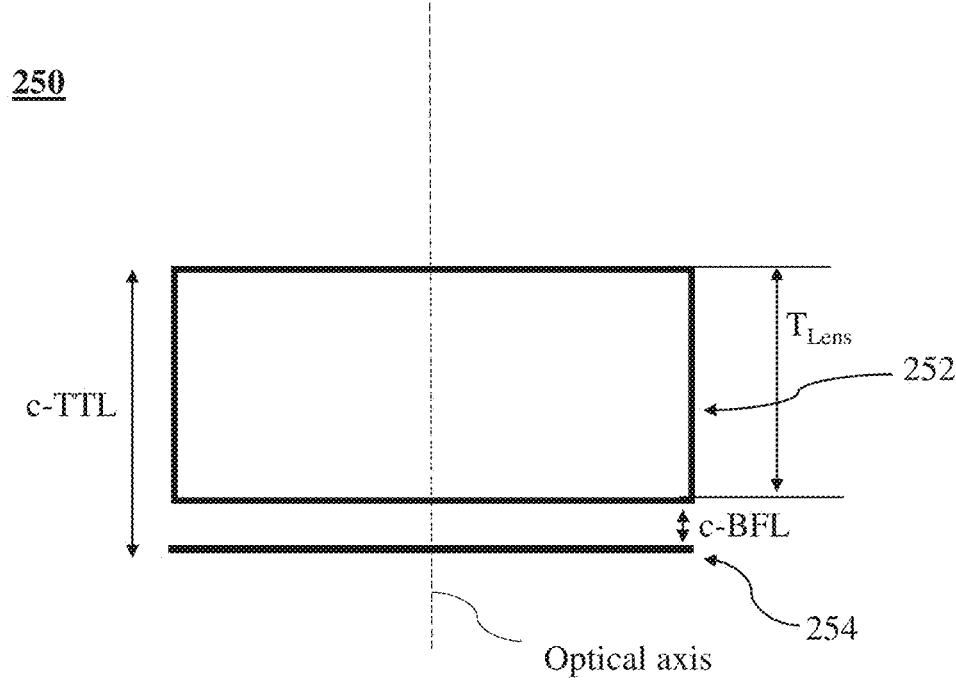
FIG. 2D      KNOWN ART

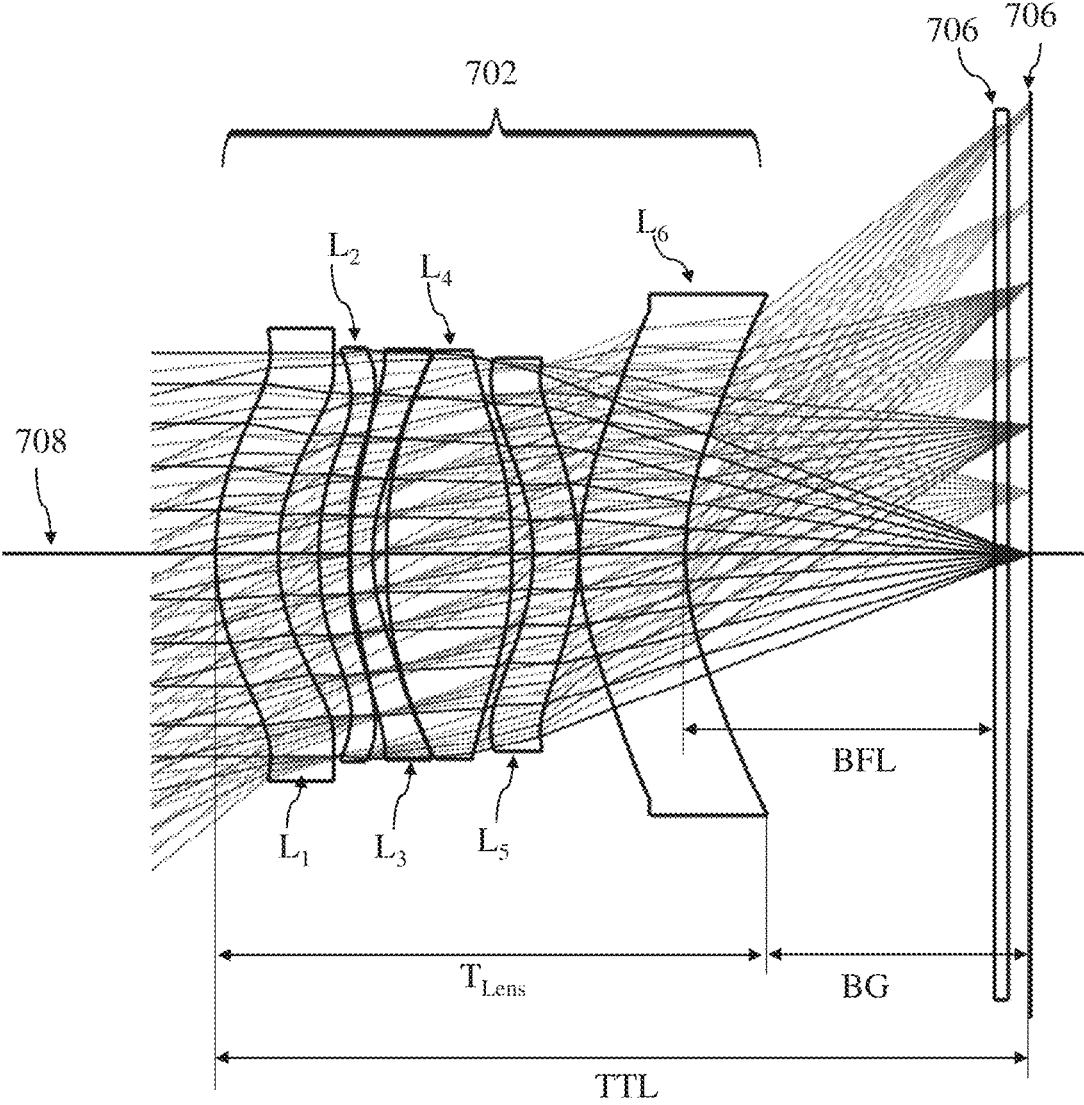
FIG. 7

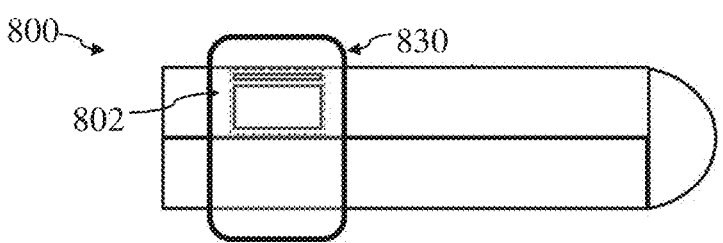
830
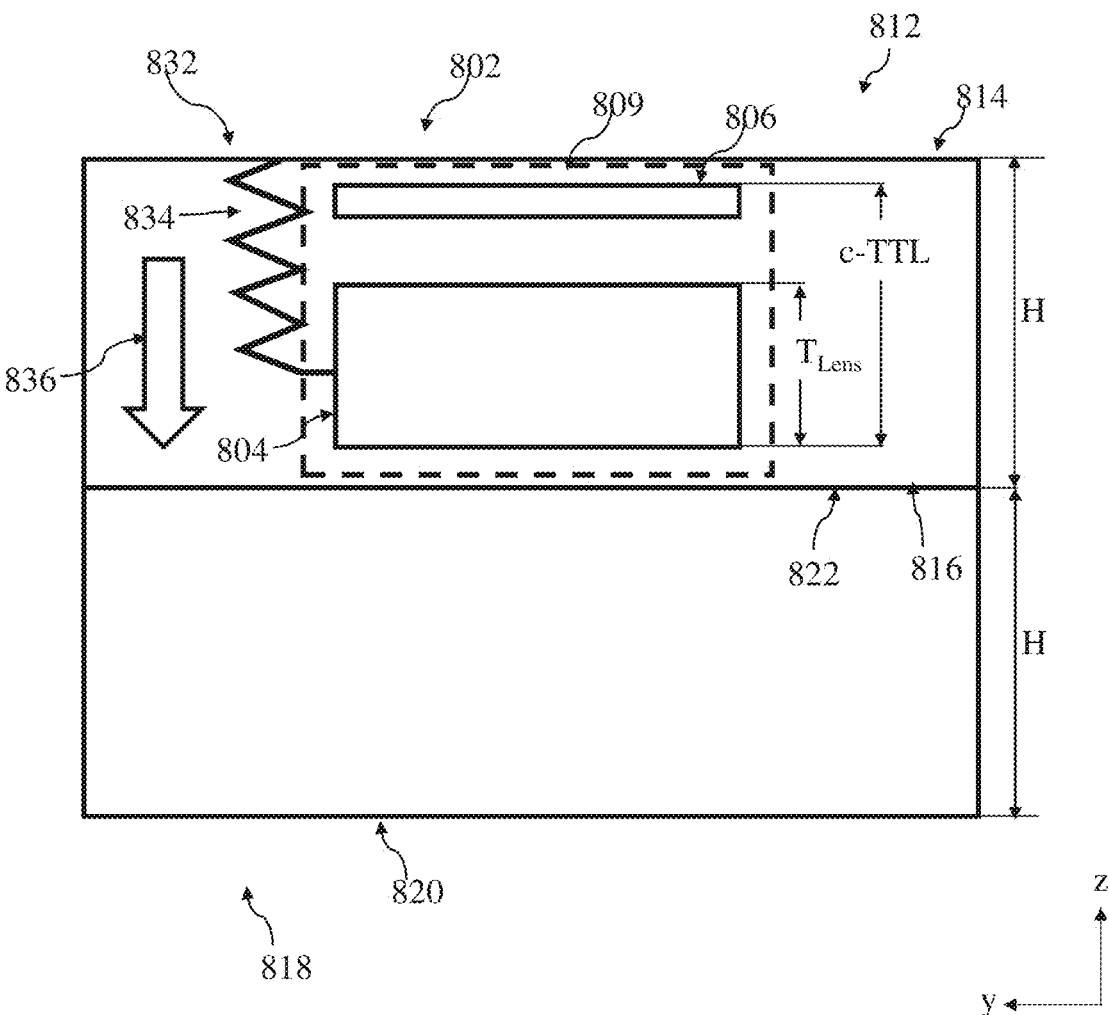
FIG. 8C

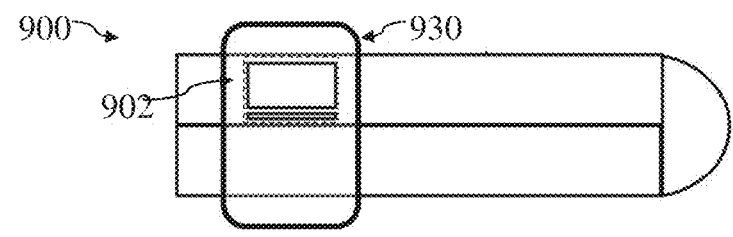
930
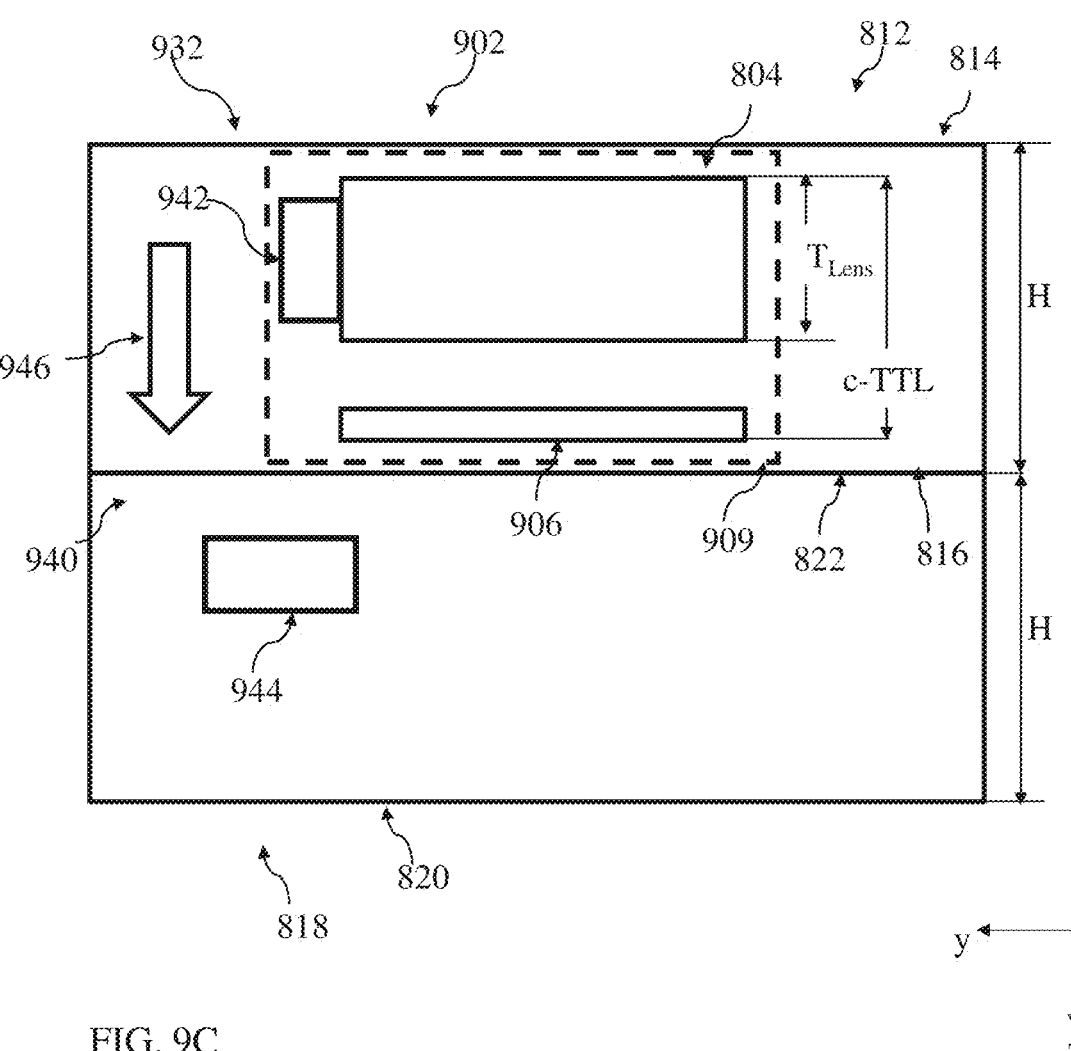
FIG. 9C

SLIM POP-OUT WIDE CAMERA LENSES AND POP-OUT CAMERA ACTUATORS

CROSS REFERENCE TO RELATED APPLICATIONS

This is a continuation from U.S. patent application Ser. No. 19/117,048 filed Mar. 30, 2025 (now allowed), which was a 371 application from international patent application PCT/IB2023/061327 filed Nov. 9, 2023, which is related to and claims priority from U.S. provisional patent application No. 63/383,721 filed Nov. 15, 2022, No. 63/492,538 filed Mar. 28, 2023, No. 63/495,148 filed Apr. 10, 2023, No. 63/507,108 filed Jun. 9, 2023 and No. 63/518,110 filed Aug. 8, 2023, which are incorporated herein by reference in their entirety.

FIELD

The present disclosure relates in general to digital cameras, and more particularly to digital cameras with pop-out ("PO") mechanisms and lenses.

Definitions

In this application and for optical and other properties mentioned throughout the description and figures, the following symbols and abbreviations are used, all for terms known in the art:

Total track length (TTL): the maximal distance, measured along an axis parallel to the optical axis of a lens, between a point of the front surface S1 of a first lens element L1 and an image sensor, when the system is focused to an infinity object distance.

Back focal length (BFL): the minimal distance, measured along an axis parallel to the optical axis of a lens, between a point of the rear surface S2N of the last lens element LN and an image sensor, when the system is focused to an infinity object distance.

Effective focal length (EFL): in a lens (assembly of lens elements L1 to LN), the distance between a rear principal point P' and a rear focal point F' of the lens.

f-number (f/#): the ratio of the EFL to an entrance pupil diameter.

BACKGROUND

Multi-aperture digital cameras (or multi-cameras) are standard in today's mobile electronic devices (or in short "mobile devices", e.g. smartphones, tablets, laptops, PDAs, headsets, etc.). In general, a multi-camera includes a Wide camera that acts as the mobile device's main (or "primary") camera, an Ultrawide (UW) camera and an (optional) Tele camera. The Main (or Wide) camera has a Wide camera sensor and a Wide camera field-of-view ($FOV_W$) of about 65-95 degrees (about 20 mm-35 mm 35 eq.FL), the UW camera has as a UW camera sensor and a UW camera field-of-view ($FOV_{UW} > FOV_W$) of about 105-130 degrees (about 10 mm-16 mm 35 eq.FL), and the Tele camera has as a Tele camera sensor and a Tele camera field-of-view ($FOV_T < FOV_W$) of about 10-40 degrees (about 50 mm-250 mm 35 eq.FL). A major challenge is the design of Wide cameras that support ever higher image quality (IQ) and still fit into thin mobile devices with device heights of e.g. <12.5 mm. For improving the IQ, ever larger image sensors are incorporated in mobile devices. Such large image sensors may have an optical format larger than 1/2", i.e. they have a sensor diagonal ("SD") of SD>8 mm, e.g. 1/1.5" (SD=10.7 mm) or even 1/1" (SD=16 mm). P-O cameras allow the incorporation of large image sensors while supporting a slim thickness of a mobile device that includes the PO camera. PO cameras are for example described in co-owned international patent application PCT/IB2020/058697.

FIG. 1A illustrates schematically the definition of various camera entities such as TTL, EFL and BFL. In most miniature lenses which are used in multi-cameras incorporated in mobile devices, the TTL is larger than the EFL, as shown in FIG. 1A e.g. for a Wide lens.

FIG. 1B shows an exemplary camera having a lens with a field of view (FOV), an EFL and an image sensor with a sensor width S. For fixed width/height ratios and a (rectangular) image sensor, the (full) image sensor diagonal (SD) is proportional to the sensor width and height. A typical width/height ratio of an image sensor is 4:3. For example, a 1/1.2" sensor has a SD of 14.3 mm. The diagonal FOV relates to EFL and SD as follows:

$$\tan\left(\frac{FOV}{2}\right) = SD/2/EFL$$

This shows that a larger EFL is required for realizing a camera with a larger image sensor, but similar FOV. Incorporating larger image sensors in Wide cameras is desirable, but it requires larger EFL for maintaining the same $FOV_W$, resulting in larger TTL, which is undesirable for integration in a slim mobile device.

FIG. 1C illustrates schematically a mobile device 100 including a known PO camera ("POC") 110 in a first state ("collapsed state") when the camera is not in use (or inactive). In the collapsed state, POC 110 has a first TTL ("collapsed TTL" or "c-TTL"), as marked. The c-TTL is compatible with the height dimensions of modern mobile devices, i.e. in the collapsed state, PO camera 110 does not exceed a height (or thickness) of mobile device 100. The height of mobile device 100 may include an elevated area of mobile device 100 ("camera bump" or simply "bump") where a multi-camera is included. c-TTL may be in the range of 5-15 mm.

FIG. 1D illustrates schematically mobile device 100 including POC 110 in a second state ("pop-out or "PO" state"). In general, only in the PO state the POC is operational as a camera. In the PO state, POC 110 has a second TTL ("TTL") as marked. TTL>c-TTL, so that POC 110 exceeds a height of mobile device 100. In other words, in the PO state POC 110 protrudes (or "pops out") from mobile device 100. Typically, a mobile device has a thickness ("T") of about T=5 mm-20 mm. TTL may be in the range of 6-25 mm. A POC may protrude from a mobile device 100 by about 1 mm-15 mm.

For switching POC 110 from the PO state to the collapsed state, an active actuator such as a stepper motor, a shaped metal alloy (SMA) actuator etc. is required. "Active" means here that an actuation requires an electrical power. Often, for switching POC 110 from the collapsed state to the PO state, no active actuator is required, but a passive actuator e.g. based on a spring force is sufficient. In this disclosure, the term "passive" indicates that an actuator and/or actuation does not require electrical power. Recently, "foldable mobile devices" such as "foldable phones" ("FPs") were introduced such as Samsung Galaxy Fold or Samsung Galaxy Flip. FPs can be "folded". When folded, FPs achieve a smaller size, what is desired. When unfolded, FPs provide a large screen area for a primary screen, what is desired as well. In general, when folded, the primary screen of a FP is not active.

POCs including a SMA actuator are described for example in co-owned international patent application PCT/IB2022/056646. Often, a SMA actuator uses SMA wires. SMA wires are beneficial for use in mobile devices, as they are inexpensive, light-weight, compact and can be used for low-power, low-noise, compact actuators. In general, SMA wires are operational under load for e.g. twenty-five thousand (25,000) cycles, which is unbeneficial as operation over hundred thousand (100,000) cycles may be mandatory when used in a mobile device.

It would be beneficial to have Wide camera lens designs that support PO Wide cameras including large image sensors such as 1/1.33" or larger, i.e. having a SD≥12 mm.

It would be beneficial to have a fully passive POC included in a mobile device, i.e. a relatively slim camera that still provides a large zoom effect or uses a large image sensor, and which does not require active actuation when switching from a PO state to a collapse state and vice versa. Such a fully passive POC is disclosed herein.

It would be beneficial to have a SMA actuator that is operational for a relatively large number of cycles (e.g. up to 100,000 cycles) and for use in a mobile device. Such a SMA actuator camera is disclosed herein.

SUMMARY

In various examples there is provided a lens system for a compact digital camera, the lens system comprising: an image sensor having a sensor diagonal SD; and a lens with a field of view FOV and having N=9 lens elements $L_1$-$L_9$ arranged along a lens optical axis OA starting with $L_1$ from an object side toward an image side, each lens element $L_i$ having a respective focal length $f_i$, with a magnitude $|f_i|$ wherein $1 \le i \le N$, the lens elements divided into two lens groups G1 and G2 separated by a big gap BG, the lens having a pop-out total track length TTL<20 mm in a PO state and a collapsed total track length c-TTL in a collapsed state, wherein the lens system is configured to switch from a PO state to a collapsed state and vice versa by collapsing BG to a collapsed big gap c-BG, wherein BG>0.2×TTL, wherein SD≥12 mm, wherein a ratio c-TTL/SD≤0.65.

In various examples there is provided a lens system for a compact digital camera, the lens system having a PO state and a collapsed state and comprising: an image sensor having a sensor diagonal SD; and a lens with N lens elements $L_1$-$L_N$ arranged along a lens optical axis OA starting with $L_1$ from an object side towards an image side, each lens element $L_i$ having a respective clear aperture diameter $DA_{Li}$ wherein $1 \le i \le N$, and having in the PO state a field of view FOV and a f number (f/#), a lens thickness $T_{Lens}$, a back focal length BFL, an effective focal length EFL, and a total track length TTL<20 mm, wherein the lens system is configured to switch from a PO state to a collapsed state and vice versa by collapsing BFL to a collapsed back focal length c-BFL, wherein BFL>0.2×TTL, wherein SD≥15 mm, and wherein a ratio c-TTL/SD<0.7.

In various examples, there is provided a foldable mobile device including a passive pop-out camera (POC), the passive POC comprising: a pop-out lens; an image sensor; and a passive pop-out (PO) actuator, wherein the foldable mobile device is unfoldable by an unfolding movement and foldable by a folding movement, both movements being performed by a user, wherein the POC has a PO state where the POC is operational and has a total track length TTL, and a collapsed state where the POC and has a collapsed c-TTL<TTL, wherein the passive PO actuator is operational to use the folding movement for switching the passive POC from the PO state to the collapsed state, and wherein the passive PO actuator is operational to use the unfolding movement for switching the passive POC from the collapsed state to the PO state.

In various examples, there is provided a foldable mobile device including a passive folded pop-out camera (POC), the passive folded POC comprising: a lens; a mirror; an image sensor; a passive pop-out actuator; and a camera housing, wherein the foldable mobile device is unfoldable by an unfolding movement and foldable by a folding movements, both movements being performed by a user, wherein the lens is located at an object side of the mirror, wherein the camera housing has a module region having a module height $H_M$ and a shoulder region having a shoulder height $H_S < H_M$, wherein the passive folded POC has a PO state where the passive folded POC is active and has a module height $H_M$, and a collapsed state where the passive folded POC and has a collapsed module height c-$H_M < H_M$, wherein the passive PO actuator is operational to use the folding movement for switching the passive folded POC from a PO state to a collapsed state, and wherein the passive PO actuator is operational to use the unfolding movement for switching the passive folded POC from a collapsed state to a PO state.

In various examples, there is provided a shape memory alloy (SMA) actuator included in a camera, the SMA actuator comprising: a plurality of P≥2 SMA wires; and a moving element operational to actuate a component included in the camera, wherein the camera is included in a mobile electronic device, wherein each SMA wire of the plurality of P SMA wires is operational over M cycles, wherein the plurality of P SMA wires is guided by the moving element, wherein a force for the actuation of the component included in the camera is provided by one SMA wire out of the plurality of P SMA wires, and wherein the P SMA wires are used consecutively so to that the SMA actuator is operational over an extended number of P×M cycles.

BRIEF DESCRIPTION OF THE DRAWINGS

Non-limiting examples of examples disclosed herein are described below with reference to figures attached hereto that are listed following this paragraph. Identical structures, elements or parts that appear in more than one figure are generally labeled with a same numeral in all the figures in which they appear. If identical elements are shown but numbered in only one figure, it is assumed that they have the same number in all figures in which they appear. The drawings and descriptions are meant to illuminate and clarify examples disclosed herein and should not be considered limiting in any way. In the drawings:

FIG. 1C illustrates schematically a mobile device including a known PO camera ("POC") in a first state ("collapsed state");

FIG. 1D illustrates schematically the mobile device of FIG. 1C in a second (pop-out) state;

FIG. 2A shows schematically a PO optical lens system disclosed herein in a PO state focused to infinity;

FIG. 2B shows schematically the PO system of FIG. 2A in a collapsed state;

FIG. 2C shows an example of a 1G PO optical lens system that comprises a PO lens disclosed herein in a PO state;

FIG. 2D shows the PO system of FIG. 2C in a collapsed state;

FIG. 7 shows another example of a 1G PO optical lens system disclosed herein.

FIG. 8C shows a zoom-in section of the foldable phone of FIG. 8A in a folded state in a cross-sectional side view.

FIG. 9C shows a zoom-in section of the foldable phone of FIG. 9A in a folded state in a cross-sectional side view.

DETAILED DESCRIPTION

Figure 1A:
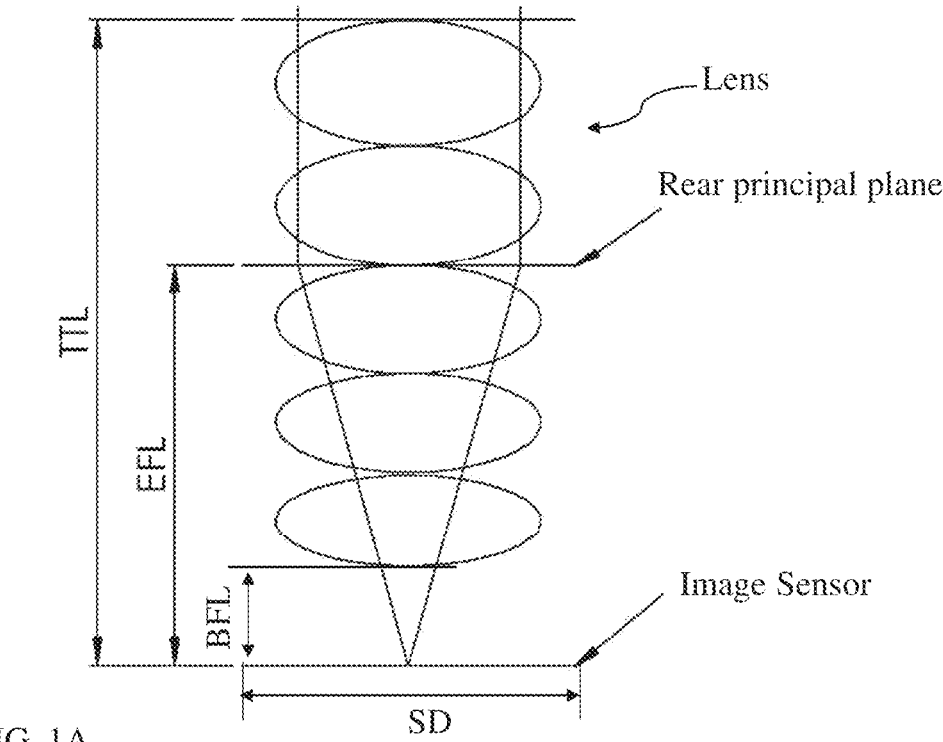
FIG. 1A illustrates schematically the definition of various entities such as TTL and EFL.
Figure 1B:
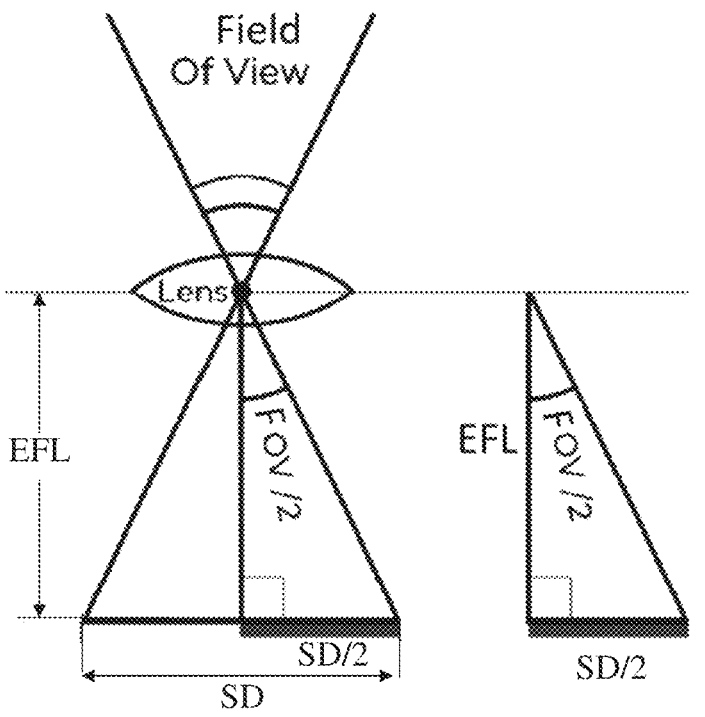
FIG. 1B shows definitions of FOV, EFL and S for a thin lens approximation or equivalence.

FIG. 2A shows a known art example of a "2-group" (or "2G") pop-out ("PO") optical lens system 200 that comprises a PO lens 202 and an image sensor 204. PO optical lens system 200 is shown in a PO or extended state (and focused to infinity). PO lens 202 is divided into two lens groups which are separated by a big gap (BG), a first, object-sided lens group ("G1") and a second, sensor-sided lens group ("G2"). The thickness of G1 is indicated by $T_{G1}$. Lens 202 includes a plurality of N lens elements Li (wherein "i" is an integer between 1 and N and wherein N may be for example between 5 and 10). L1 is the lens element closest to the object side and LN is the lens element closest to the image side, i.e. the side where the image sensor is located. This order holds for all lenses and lens elements disclosed herein. Each lens element Li comprises a respective front surface S2i–1 (the index "2i–1" being the number of the front surface) and a respective rear surface S2i (the index "2i" being the number of the rear surface). This numbering convention is used throughout the description. Alternatively, as done throughout this description, lens surfaces are marked as "Sk", with k running from 1 to 2N. The front surface and the rear surface may be in some cases aspherical. This is however not limiting.

As used herein the term "front surface" of each lens element refers to the surface of a lens element located closer to the entrance of the camera (camera object side) and the term "rear surface" refers to the surface of a lens element located closer to the image sensor (camera image side).

Each lens group includes one or more lens elements Li. G1 may include ≥5 elements and G2 may include 1-2 elements. G2 may act as a field lens as known in the art.

FIG. 2B shows 2G PO optical lens system 200 in a collapsed state. Big gap BG is collapsed to a collapsed BG (marked "c-BG"), i.e. a distance between G1 and G2 is reduced, resulting in a collapsed TTL ("c-TTL"). c-BG may be in the range 0.1 mm-5 mm. Only BG changes. No other distances in PO optical lens system 200, such as a BFL or distances between lens elements included in G1 and G2 respectively, change.

FIG. 2C shows another example of a 1G PO optical lens system 250 that comprises a PO lens 252 having a lens thickness $T_{Lens}$ and an image sensor 254 disclosed herein in a PO state. PO lens 252 has a lens optical axis, as shown. 1G PO optical lens system 250 is shown in a PO or extended state (and focused to infinity). Lens 252 includes a plurality of N lens elements. A BFL is shown.

FIG. 2D shows 1G PO optical lens system 250 in a collapsed state. BFL is collapsed to a collapsed BFL (marked "c-BFL"), i.e. a distance between lens 252 and image sensor 254 is reduced, resulting in a collapsed TTL ("c-TTL"). A fundamental lower limit for c-TTL is given by the thickness of lens 252 ("$T_{Lens}$"), i.e. c-TTL>$T_{Lens}$. In fact, c-TTL=$T_{Lens}$+c-BFL, wherein, c-BFL=0.2 mm–1.5 mm or more. This means that c-TTL=$T_{Lens}$+0.2 mm–$T_{Lens}$+1.5 mm or more.

2G PO optical lens system 200 and is operational to be used in a PO camera. The resulting POC is operational as a camera only in the PO state. In the collapsed state, the POC is not operational as a camera, i.e. it is inactive.

1G PO optical lens system 250 is a "1-group" (or "1G") PO optical lens system, i.e. lens 252 moves as one unit, meaning that distances between lens elements included in lens 252 do not change when switching from the PO state to the collapsed state, but only the BFL changes. 2G PO optical lens system 200 and 1G PO optical lens system 250 can (or are operational to) be included in a POC. For performing optical image stabilization (OIS), the POC may use several methods known in the art. Such methods may be "lens shift OIS", wherein the lens is moved relative to the image sensor and a camera hosting mobile device for OIS, or "sensor shift OIS", wherein the image sensor is moved relative to the lens and to a camera hosting mobile device for OIS.

All PO optical lens systems disclosed herein can be used in the POC examples described in co-owned PCT patent application PCT/IB2020/058697.

All PO optical lens systems disclosed below are shown in a PO state, where a POC including the optical lens system is operational.

In a collapsed state, all 2G PO optical lens system examples have a c-BG of 0.2 mm-4.0 mm. A small c-BG is beneficial for achieving a slim camera module that can be integrated in a slim mobile device such as a smartphone. A cTTL may be in the range between 9.94 mm to 13.9 mm. In a collapsed state, all 1G PO optical lens system examples have a c-BFL of 0.2 mm-3.0 mm. A small c-BFL is beneficial for achieving a slim camera module. A cTTL may be in the range between 9.26 mm to 13.22 mm. To clarify, all lens systems disclosed herein may beneficially be included or incorporated in mobile devices such as smartphones.

Figure 3:
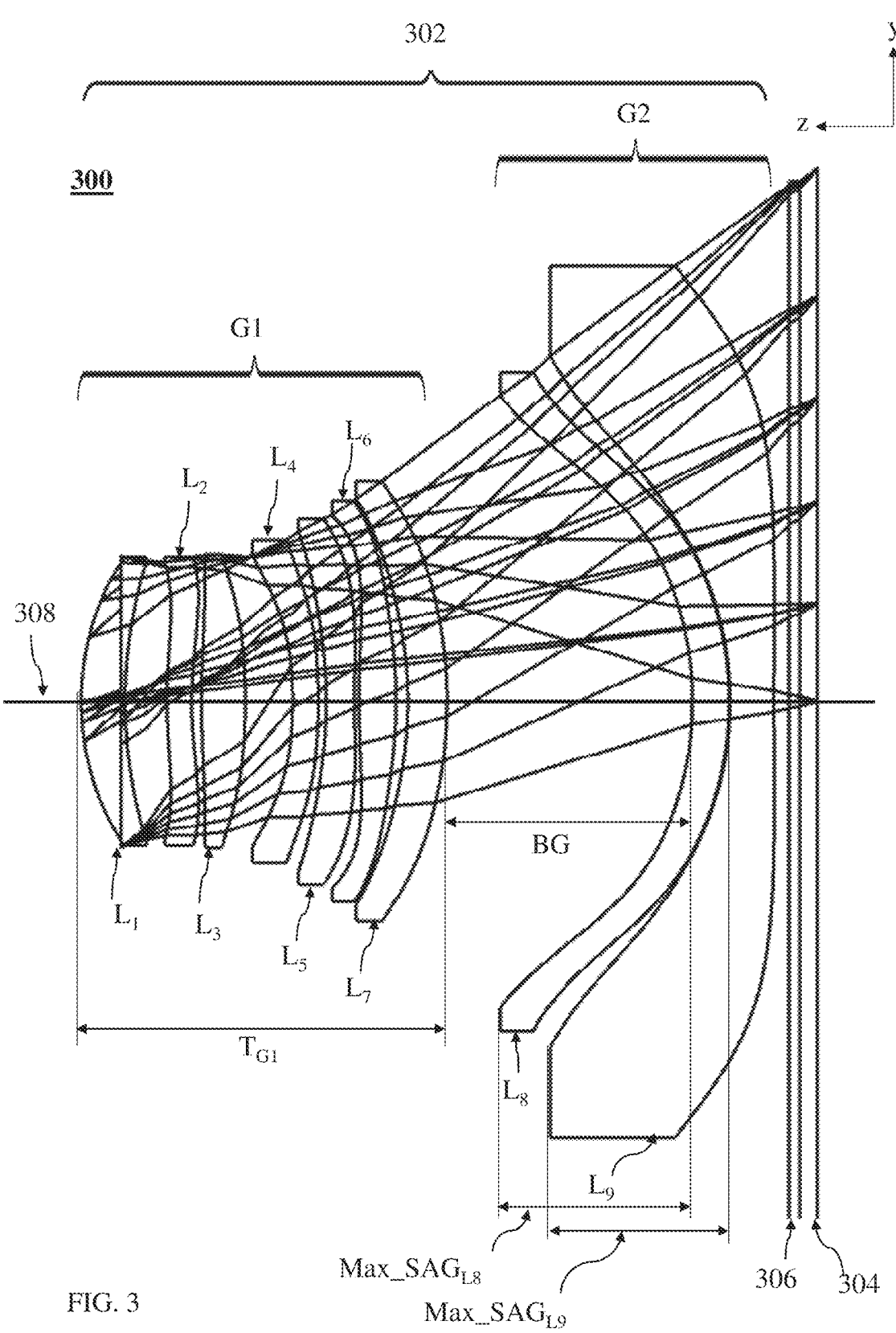
FIG. 3 shows an example of a 2G PO optical lens system disclosed herein.

FIG. 3 shows an example of a 2G PO optical lens system disclosed herein and numbered 300. Lens system 300 comprises a PO lens 302 divided into two lens groups G1 and G2 and having a lens optical axis 308, an image sensor 304 and, optionally, an optical element 306. Optical element 306 may be for example infra-red (IR) filter, and/or a glass image sensor dust cover. Image sensor 304 may have a SD of 21.5 mm. G1 includes 7 lens elements ($L_1$-$L_7$) and G2 includes 2 lens elements ($L_8$-$L_9$). Optical rays pass through lens 302 and form an image on image sensor 304. FIG. 3 shows 6 fields with 4 rays for each.

Detailed optical data and surface data for PO lens 302 are given in Tables 1-2. Table 1 provides surface types and Table 2 provides aspheric coefficients. The surface types are:

a) Plano: flat surfaces, no curvature.

b) Q type 1 (QT1) surface sag formula:

$$z(r) = \frac{cr^2}{1 + \sqrt{1 - (1 + k)c^2 r^2}} + D_{con}(u) \quad \text{(Eq. 1)}$$

$$D_{con}(u) = u^4 \sum_{n=0}^{N} A_n Q_n^{con}(u^2)$$

$$u = \frac{t}{r_{norm}}, \quad x = u^2$$

-continued $$Q_0^{con}(x) = 1 \quad Q_1^{con} = -(5 - 6x) \quad Q_2^{con} = 15 - 14x(3 - 2x)$$

$$Q_3^{con} = -\{35 - 12x[14 - x(21 - 10x)]\}$$

$$Q_4^{con} = 70 - 3x\{168 - 5x[84 - 11x(8 - 3x)]\}$$

$$Q_5^{con} = -[126 - x(1260 - 11x\{420 - x[720 - 13x(45 - 14x)]\})]$$

c) Even Asphere (ASP) surface sag formula:

$$z(r) = \frac{cr^2}{1 + \sqrt{1 - (1 + k)c^2 r^2}} + \alpha_1 r^2 + \alpha_2 r^4 + \alpha_3 r^6 + \alpha_4 r^8 + \alpha_5 r^{10} + \quad \text{(Eq. 2)}$$

$$\alpha_6 r^{12} + \alpha_7 r^{14} + \alpha_8 r^{16}$$

where {z, r} are the standard cylindrical polar coordinates, c is the paraxial curvature of the surface, k is the conic parameter, $r_{norm}$ is generally one half of the surface's clear aperture (CA), and $A_n$ are the aspheric coefficients shown in lens data tables. The Z axis is positive towards the image side. Values for CA are given as a clear aperture radius, i.e. D/2. The reference wavelength is 555.0 nm. Units are in mm except for refractive index ("Index") and Abbe #. Each lens element Li has a respective focal length fi, given in Table 1. The FOV is given as half FOV (HFOV).

Example 300
EFL 11.58 mm, F number 2.0, HFOV 41.35 deg.

| Surface # | Comment | Type | Curvature Radius | Thickness | Aperture Radius (D/2) | Material | Index | Abbe# | Focal length |
|---|---|---|---|---|---|---|---|---|---|
| 1 | A.S | | | | | | | | |
| 2 | Lens 1 | QForb type I | 5.296 | 0.867 | 2.9 | N-SK14 | 1.603 | 60.6 | 20.0 |
| 3 | | QForb type I | 8.851 | 0.832 | 2.9 | | | | |
| 4 | Lens 2 | QForb type I | 10.451 | 0.487 | 2.9 | EP6000 | 1.639 | 23.5 | −43.9 |
| 5 | | QForb type I | 7.509 | 0.196 | 2.9 | | | | |
| 6 | Lens 3 | QForb type I | 18.342 | 0.866 | 2.9 | F52R | 1.535 | 56.0 | 14.3 |
| 7 | | QForb type I | −12.989 | 0.938 | 2.9 | | | | |
| 8 | Lens 4 | QForb type I | −8.478 | 0.504 | 3.2 | EP9000 | 1.671 | 19.2 | −31.8 |
| 9 | | QForb type I | −14.295 | 0.162 | 3.2 | | | | |
| 10 | Lens 5 | QForb type I | −8.344 | 0.558 | 3.6 | APL5014C | 1.544 | 56.0 | −11.5 |
| 11 | | QForb type I | 25.782 | 0.088 | 3.6 | | | | |
| 12 | Lens 6 | QForb type I | 17.856 | 0.736 | 4.0 | NLASF31A | 1.883 | 40.8 | 6.5 |
| 13 | | QForb type I | −8.410 | 0.231 | 4.0 | | | | |
| 14 | Lens 7 | QForb type I | −7.598 | 0.775 | 4.4 | EPI0000 | 1.680 | 18.2 | −97.9 |
| 15 | | QForb type I | −8.917 | 4.857 | 4.4 | | | | |
| 16 | Lens 8 | QForb type I | −6.739 | 0.724 | 6.5 | EP9000 | 1.671 | 19.2 | 598.4 |
| 17 | | QForb type I | −6.912 | 0.021 | 6.5 | | | | |
| 18 | Lens 9 | QForb type I | −6.815 | 0.867 | 8.6 | EP6000 | 1.639 | 23.5 | −9.9 |
| 19 | | QForb type I | 99.217 | 0.300 | 8.6 | | | | |
| 20 | Filter | Plano | | 0.210 | 10.3 | N-BKI | 1.513 | 63.6 | |
| 21 | | Plano | | 0.356 | 10.3 | | | | |
| 22 | Image | Plano | Infinity | — | — | | | | |

TABLE 2

| | Aspheric Coefficients | | | | | |
|---|---|---|---|---|---|---|
| Surface # | Conic | NR | A0 | A1 | A2 | A3 |
| 2 | 0.080 | 2.738 | 3.51E−03 | 2.668E−03 | 4.047E−04 | 1.287E−04 |
| 3 | 1.048 | 3.106 | −5.38E−02 | 4.704E−03 | −2.747E−03 | −2.255E−03 |
| 4 | 3.607 | 2.922 | −5.68E−01 | 1.847E−03 | −4.643E−03 | −6.602E−04 |
| 5 | 0.819 | 2.906 | −6.06E−01 | 1.425E−02 | −3.994E−03 | 2.972E−05 |
| 6 | 4.521 | 2.622 | −1.41E−01 | 9.668E−03 | 1.194E−03 | 4.779E−05 |
| 7 | −9.227 | 3.060 | −2.26E−01 | 4.164E−02 | 7.034E−03 | 2.231E−03 |
| 8 | −12.430 | 2.915 | −4.92E−01 | 7.762E−02 | −1.138E−02 | 1.989E−04 |

TABLE 2-continued

| 9 | 5.762 | 3.037 | -2.76E-01 | 6.029E-02 | -6.464E-03 | -1.041E-03 |
|---|---|---|---|---|---|---|
| 10 | -1.831 | 3.749 | 1.79E-01 | -3.833E-02 | 2.568E-02 | 1.736E-03 |
| 11 | 31.513 | 3.597 | -9.59E-01 | 6.888E-02 | -2.136E-02 | 2.324E-03 |
| 12 | 5.847 | 3.523 | -7.13E-01 | -2.555E-02 | -1.241E-02 | -1.200E-03 |
| 13 | 0.998 | 3.520 | 2.94E-01 | -7.142E-02 | 7.877E-03 | 9.577E-04 |
| 14 | -10.206 | 4.120 | -3.07E-01 | -1.148E-02 | -4.223E-04 | -4.414E-04 |
| 15 | -9.394 | 4.438 | -5.57E-01 | 8.657E-03 | 1.178E-02 | 8.436E-03 |
| 16 | 0.013 | 6.050 | -5.33E-01 | 3.998E-01 | 1.801E-01 | -3.201E-02 |
| 17 | -0.030 | 6.318 | -3.44E-01 | 5.083E-01 | 1.535E-01 | -3.792E-02 |
| 18 | -0.146 | 5.999 | 9.69E-02 | 2.159E-01 | 1.499E-02 | 1.158E-02 |
| 19 | 23.176 | 10.048 | -4.19E+00 | 1.094E-01 | -1.130E-01 | -2.194E-01 |

Aspheric Coefficients

| Surface # | A4 | A5 | A6 | A7 | A8 | A9 |
|---|---|---|---|---|---|---|
| 2 | 1.342E-05 | -1.493E-07 | -3.010E-06 | 8.064E-08 | -4.711E-07 | 4.908E-08 |
| 3 | -1.192E-03 | -4.255E-04 | -8.055E-05 | -4.017E-05 | -7.477E-06 | -9.934E-06 |
| 4 | 5.037E-05 | 3.540E-05 | 1.502E-04 | 2.437E-05 | 5.036E-05 | -1.493E-05 |
| 5 | 1.865E-05 | 4.675E-05 | 2.764E-05 | 1.193E-06 | 6.276E-06 | 2.015E-05 |
| 6 | 1.157E-04 | -2.590E-05 | 7.424E-07 | 5.427E-07 | 1.006E-07 | 5.096E-08 |
| 7 | 7.648E-04 | 2.171E-04 | 2.216E-04 | 1.050E-04 | 2.141E-05 | 1.176E-05 |
| 8 | 5.194E-04 | -7.381E-05 | -4.656E-07 | 3.081E-05 | -1.308E-05 | 6.899E-06 |
| 9 | 8.115E-04 | -9.350E-05 | 2.656E-05 | 4.597E-06 | -1.024E-06 | 8.825E-07 |
| 10 | 2.095E-03 | -5.837E-04 | -1.907E-04 | 1.369E-05 | 1.026E-04 | -6.774E-05 |
| 11 | -1.969E-04 | -1.188E-04 | -9.841E-05 | -1.679E-04 | -3.788E-05 | 5.609E-06 |
| 12 | -3.967E-04 | 2.232E-04 | -1.445E-05 | 2.555E-05 | -1.400E-06 | 4.187E-06 |
| 13 | -1.163E-03 | 1.956E-04 | 1.023E-05 | -1.922E-06 | 1.087E-06 | 3.064E-08 |
| 14 | -1.857E-03 | 1.836E-03 | 5.531E-04 | -3.892E-04 | -5.765E-05 | 5.250E-05 |
| 15 | 1.697E-03 | 7.839E-04 | 2.024E-04 | -1.538E-04 | 5.044E-05 | 3.591E-05 |
| 16 | -1.711E-02 | 1.747E-02 | 3.924E-04 | 1.421E-05 | -2.504E-04 | -1.711E-04 |
| 17 | -3.326E-02 | 1.767E-02 | 1.532E-04 | 1.282E-03 | -8.749E-05 | -8.814E-06 |
| 18 | -3.790E-03 | -1.038E-03 | 2.307E-04 | -1.016E-06 | 2.362E-05 | 9.442E-08 |
| 19 | -1.902E-01 | -7.502E-02 | -4.053E-02 | -5.311E-03 | 3.247E-03 | 3.848E-03 |

The power sequence for lens element from $L_1$ to $L_9$ is as follows: +-+--+-+- (plus-minus-plus-minus-minus-plus-minus-plus-minus), i.e. PO lens 302 includes four positive lens elements and five negative lens elements. Both $L_8$ and $L_9$ have large maximum SAG of 3.8 mm and 3.5 mm respectively, as indicated by "Max_SAG$_{L8}$" and "Max_SAG$_{L9}$" respectively.

$L_1$ is made of glass;

EFL$_{G1}$ and EFL$_{G2}$ have opposite sign but similar magnitude, i.e. |EFL$_{G1}$| and |EFL$_{G2}$| vary by less than 300 from each other;

a thickness of G1 is about 4.5 times larger than a thickness of G2;

$f_9$ and EFL$_{G2}$ have identical sign and similar magnitude, i.e. $f_9$ and EFL$_{G2}$ vary by less than 4% from each other;

$f_6$ is the strongest lens element of lens 306. $f_6$ is more than 1.5 times stronger than lens 306;

$L_4$ and $L_5$ are close to each other. AGT$_{1.4-1.5}$ is less than 20% of TTL;

a ratio of cTTL and SD is between 0.46-0.64;

a ratio of BG and TTL is 0.33;

a ratio of BG and cTTL is between 0.35-0.49;

a ratio of cTTL and TTL is between 0.68-0.94;

a ratio of cTTL and EFL is between 0.86-1.19;

a maximum SAG of $L_8$ (Max_SAG$_{L8}$) is 5.25 times larger than $L_8$'s thickness; and a maximum SAG of $L_9$ (Max_SAG$_{L9}$) is 4.04 times larger than $L_9$'s thickness.

Figure 4:
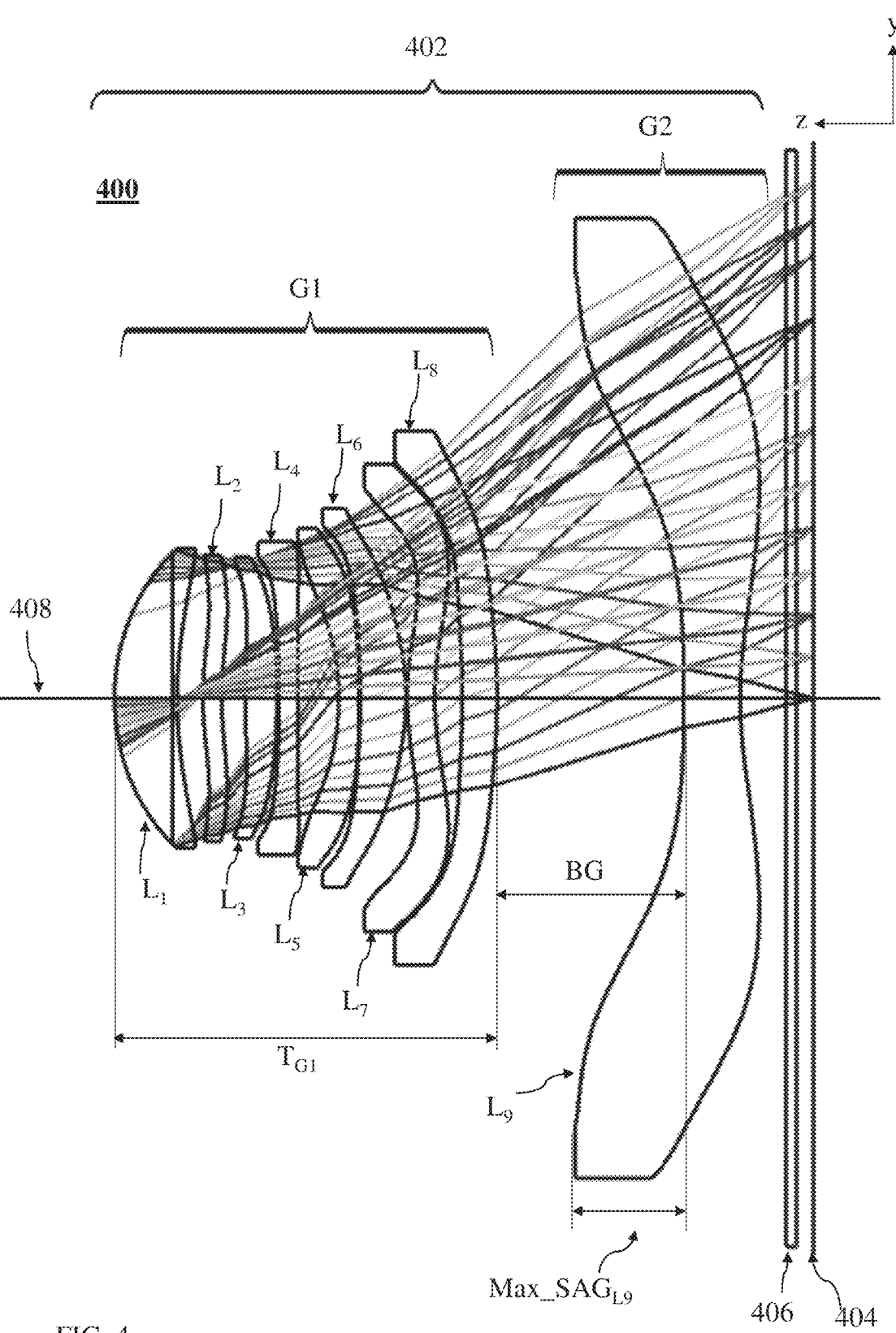
FIG. 4 shows another example of a 2G PO optical lens system disclosed herein.

FIG. 4 shows another example of a 2G PO optical lens system disclosed herein and numbered 400. Lens system 400 comprises a PO lens 402 divided into two lens groups G1 and G2 and having a lens optical axis 408, an image sensor 404 and, optionally, an optical element 406. Image sensor 404 may have a SD of 21.5 mm. G1 includes 8 lens elements ($L_1$-$L_8$) and G2 includes 1 lens element ($L_9$). Detailed optical data and surface data for PO lens 402 are given in Tables 3-4. Table 3 provides surface types and Table 4 provides aspheric coefficients.

$L_1$ and $L_6$ are made of glass;

EFL$_{G1}$ and EFL$_{G2}$ have opposite sign but similar magnitude, i.e. |EFL$_{G1}$| and |EFL$_{G2}$| vary by less than 25% from each other;

a center thickness of G1 is about 7 times larger than a center thickness of G2;

$f_9$ and EFL$_{G2}$ have identical sign and similar magnitude, i.e. $f_9$ and EFL$_{G2}$ vary by less than 2% from each other;

$f_6$ is the strongest lens element of lens 406. $f_6$ is about 1.5 times stronger than lens 406;

$L_5$ and $L_6$ are close to each other;

a ratio of cTTL and SD is between 0.49-0.65;

a ratio of BG and TTL is 0.27;

a ratio of BG and cTTL is between 0.27-0.36;

a ratio of cTTL and TTL is between 0.75-0.98;

a ratio of cTTL and EFL is between 0.92-1.21; and a sequence of lens powers from $L_1$ to $L_9$ is plus-plus-plus-minus-minus-plus-plus-plus-minus, i.e. PO lens 402 includes six positive lens elements and three negative lens elements.

TABLE 3

Example 400
EFL = 11.51 mm, f number = 1.91, HFOV = 43.91 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.174 | 3.010 | | | | |
| 2 | Lens 1 | QT1 | 4.465 | 1.269 | 3.018 | Glass | 1.48 | 84.1 | 17.624 |
| 3 | | | 8.467 | 0.528 | 2.928 | | | | |
| 4 | Lens 2 | QT1 | 6.779 | 0.380 | 2.881 | Plastic | 1.53 | 55.7 | 146.928 |
| 5 | | | 7.271 | 0.483 | 2.846 | | | | |
| 6 | Lens 3 | QT1 | 28.032 | 0.631 | 2.790 | Plastic | 1.53 | 55.7 | 22.946 |
| 7 | | | −21.782 | 0.050 | 2.831 | | | | |
| 8 | Lens 4 | QT1 | −49.310 | 0.371 | 2.838 | Plastic | 1.61 | 25.6 | −53.107 |
| 9 | | | 98.687 | 0.840 | 3.157 | | | | |
| 10 | Lens 5 | QT1 | −5.386 | 0.402 | 3.190 | Plastic | 1.59 | 28.4 | −7.879 |
| 11 | | | 35.441 | 0.034 | 3.419 | | | | |
| 12 | Lens 6 | QT1 | −35.825 | 0.923 | 3.492 | Glass | 1.80 | 46.2 | 7.602 |
| 13 | | | −5.275 | 0.031 | 3.831 | | | | |
| 14 | Lens 7 | QT1 | 6.367 | 0.558 | 4.238 | Plastic | 1.54 | 55.9 | 317.898 |
| 15 | | | 6.404 | 0.560 | 4.736 | | | | |
| 14 | Lens 8 | QT1 | −14.323 | 0.703 | 4.770 | Plastic | 1.67 | 19.2 | 85.677 |
| 15 | | | −11.714 | 3.788 | 5.401 | | | | |
| 14 | Lens 9 | QT1 | −88.617 | 1.149 | 8.697 | Plastic | 1.59 | 28.4 | −12.787 |
| 15 | | | 8.305 | 0.930 | 9.770 | | | | |
| 16 | Filter | Plano | Infinity | 0.210 | — | Glass | 1.52 | 64.2 | |
| 17 | | | Infinity | 0.350 | — | | | | |
| 18 | Image | Plano | Infinity | — | — | | | | |

TABLE 4

Aspheric Coefficients

| Surface # | Norm Radius | A0 | A1 | A2 | A3 | A4 |
|---|---|---|---|---|---|---|
| 2 | 3.076 | 7.27E−02 | 1.24E−02 | 6.82E−04 | −9.51E−04 | −6.38E−04 |
| 3 | 2.911 | −6.50E−02 | 2.41E−03 | −8.14E−04 | −5.80E−04 | −1.16E−04 |
| 4 | 2.875 | −8.05E−01 | 3.45E−02 | 5.36E−04 | −3.70E−03 | −2.47E−05 |
| 5 | 2.920 | −7.27E−01 | 4.56E−02 | 3.01E−03 | −5.30E−03 | 3.91E−04 |
| 6 | 2.920 | −4.72E−01 | −2.52E−02 | 1.01E−02 | 1.07E−04 | 7.14E−07 |
| 7 | 2.942 | −3.65E−01 | 1.26E−02 | −4.60E−03 | 8.76E−03 | −2.42E−03 |
| 8 | 2.885 | −2.82E−01 | −4.15E−02 | −2.93E−02 | 5.10E−03 | −5.15E−05 |
| 9 | 3.225 | −6.37E−02 | −2.64E−02 | −1.49E−02 | −2.21E−04 | 3.45E−03 |
| 10 | 3.309 | 3.13E−01 | 1.36E−01 | −3.02E−02 | −1.32E−02 | −2.41E−04 |
| 11 | 3.890 | −1.52E+00 | 4.19E−01 | 1.38E−01 | 1.38E−01 | 1.49E−03 |
| 12 | 4.221 | −8.74E−01 | 1.06E−01 | 1.49E−01 | 9.04E−02 | −1.09E−02 |
| 13 | 4.681 | 1.67E+00 | 1.52E−01 | 6.47E−02 | −1.51E−02 | 5.49E−02 |
| 14 | 5.440 | −7.46E+00 | −2.79E−01 | −4.62E−01 | −2.06E−01 | 1.40E−01 |
| 15 | 6.116 | −5.92E+00 | 8.63E−01 | 5.84E−02 | −1.58E−01 | −6.37E−02 |
| 16 | 6.405 | −2.63E−01 | 1.09E+00 | 6.31E−01 | −1.89E−01 | 1.67E−02 |
| 17 | 6.886 | 5.67E−01 | 1.14E+00 | 7.01E−01 | 5.77E−02 | 3.80E−02 |
| 18 | 10.350 | −2.73E+00 | 1.94E+00 | −3.27E−01 | 9.53E−01 | 6.28E−01 |
| 19 | 10.578 | −6.87E+00 | 5.56E−01 | −9.11E−01 | −4.79E−01 | −3.77E−01 |

Aspheric Coefficients

| Surface # | A5 | A6 | A7 | A8 | A9 | A10 |
|---|---|---|---|---|---|---|
| 2 | −4.26E−04 | −1.86E−04 | −9.15E−05 | −2.77E−05 | — | — |
| 3 | −1.65E−04 | 1.32E−04 | −3.56E−05 | 1.91E−05 | — | — |
| 4 | 5.86E−05 | −4.96E−05 | −3.61E−06 | −5.42E−06 | — | — |
| 5 | −7.99E−05 | −1.04E−04 | −5.05E−05 | 3.22E−05 | — | — |
| 6 | −5.26E−04 | −2.16E−04 | −1.43E−05 | 8.49E−05 | — | — |
| 7 | −1.93E−04 | −4.80E−04 | 1.94E−04 | 3.48E−05 | — | — |
| 8 | 8.22E−04 | −3.41E−04 | 7.37E−05 | 6.32E−05 | — | — |
| 9 | 1.70E−03 | 1.69E−04 | 2.75E−04 | 1.72E−04 | — | — |
| 10 | 3.39E−03 | −1.62E−03 | −1.15E−03 | −2.31E−04 | −7.09E−05 | −1.00E−05 |
| 11 | −1.29E−02 | −2.52E−02 | −4.38E−04 | −1.43E−03 | 1.66E−03 | 1.60E−04 |
| 12 | −3.68E−03 | 2.33E−03 | 1.52E−02 | 2.08E−03 | 1.55E−03 | −1.26E−03 |
| 13 | 2.80E−02 | −2.77E−02 | −6.18E−02 | −4.71E−02 | −1.97E−02 | −4.26E−03 |
| 14 | 1.29E−01 | −7.39E−03 | −6.79E−02 | −2.51E−02 | 1.14E−03 | 3.16E−03 |
| 15 | 1.92E−02 | 1.99E−02 | −9.25E−03 | −3.33E−03 | 2.16E−03 | 2.14E−03 |

TABLE 4-continued

| 16 | 3.63E−02 | −4.17E−02 | −1.08E−01 | −6.44E−02 | −8.71E−03 | 5.47E−03 |
| 17 | −1.72E−02 | 4.77E−02 | 8.05E−02 | 6.95E−02 | 3.81E−02 | 1.10E−02 |
| 18 | 4.54E−01 | 2.31E−01 | 9.90E−02 | 1.05E−02 | — | — |
| 19 | −1.24E−01 | −9.24E−02 | −3.29E−02 | −1.17E−02 | — | — |

Figure 5:
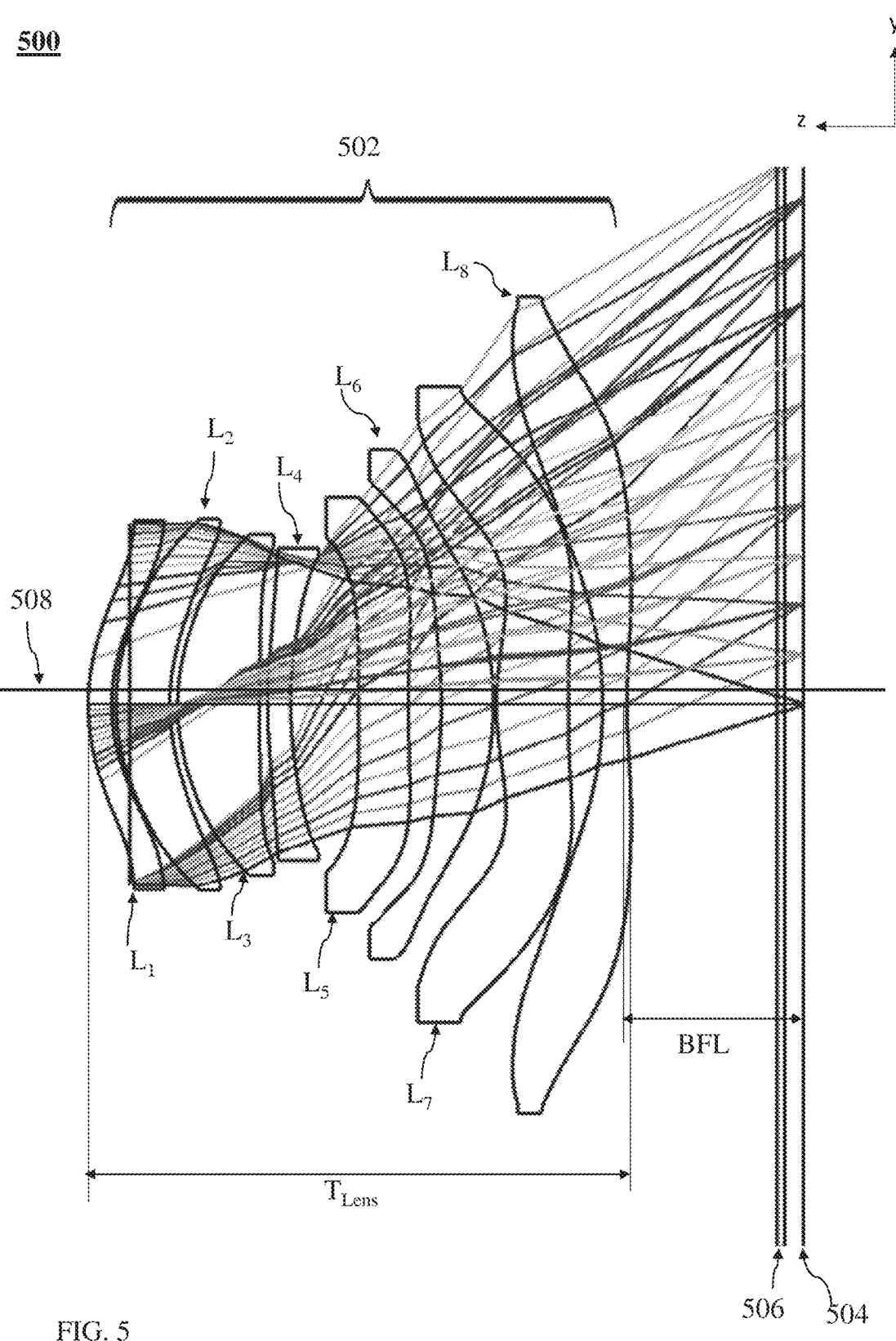
FIG. 5 shows an example of a 1G PO optical lens system disclosed herein.

FIG. 5 shows an example of a 1G PO optical lens system disclosed herein and numbered 500. Lens system 500 comprises a PO lens 502 having a lens optical axis 508, an image sensor 504 and, optionally, an optical element 506. Image sensor 504 may have a SD of 21.5 mm. PO lens 502 includes 8 lens elements ($L_1$-$L_8$). Optical rays pass through lens 502 and form an image on image sensor 504. Detailed optical data and surface data for PO lens 502 are given in Tables 5-6. Table 5 provides surface types and Table 6 provides aspheric coefficients.

TABLE 5

Example 500
EFL = 11.53 mm, F number = 1.675, HFOV = 41.862 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −0.792 | 3.441 | | | | |
| 2 | Lens 1 | QT1 | 4.440 | 0.447 | 3.441 | Plastic | 1.67 | 19.2 | −67.132 |
| 3 | | | 3.880 | 0.081 | 3.433 | | | | |
| 4 | Lens 2 | QT1 | 4.059 | 1.012 | 3.460 | Plastic | 1.54 | 55.9 | −305.423 |
| 5 | | | 3.614 | 0.153 | 3.329 | | | | |
| 6 | Lens 3 | QT1 | 3.881 | 1.545 | 3.169 | Plastic | 1.54 | 55.9 | 8.562 |
| 7 | | | 19.631 | 0.160 | 2.949 | | | | |
| 8 | Lens 4 | QT1 | 7.897 | 0.441 | 2.901 | Plastic | 1.67 | 19.2 | −148.887 |
| 9 | | | 7.158 | 1.286 | 2.752 | | | | |
| 10 | Lens 5 | QT1 | 118.726 | 0.949 | 3.105 | Plastic | 1.59 | 28.3 | −58.862 |
| 11 | | | 26.823 | 0.625 | 3.877 | | | | |
| 12 | Lens 6 | QT1 | −7.609 | 0.986 | 4.194 | Plastic | 1.57 | 37.4 | 47.407 |
| 13 | | | −6.213 | 0.058 | 4.786 | | | | |
| 14 | Lens 7 | QT1 | 5.608 | 1.362 | 5.324 | Plastic | 1.54 | 55.9 | 12.310 |
| 15 | | | 30.920 | 0.652 | 5.973 | | | | |
| 16 | Lens 8 | QT1 | −8.303 | 0.464 | 7.496 | Plastic | 1.53 | 55.7 | −8.827 |
| 17 | | | 11.243 | 2.841 | 7.698 | | | | |
| 18 | Filter | Plano | Infinity | 0.157 | — | Glass | 1.52 | 64.2 | |
| 19 | | | Infinity | 0.350 | — | | | | |
| 20 | Image | Plano | Infinity | — | — | | | | |

TABLE 6

Aspheric Coefficients

| Surface # | Norm Radius | A0 | A1 | A2 | A3 | A4 | A5 | A6 | A7 |
|---|---|---|---|---|---|---|---|---|---|
| 2 | 3.472 | −6.98E−01 | −1.29E−01 | 1.87E−02 | −2.19E−04 | 8.73E−04 | −1.09E−03 | 2.48E−04 | — |
| 3 | 3.471 | −9.83E−01 | −1.91E−01 | 2.97E−02 | −1.07E−02 | 1.05E−03 | −1.65E−03 | 2.91E−04 | — |
| 4 | 3.526 | −4.54E−01 | −2.07E−03 | −1.68E−03 | −1.42E−02 | −2.89E−03 | −1.15E−03 | −6.85E−04 | — |
| 5 | 3.389 | −1.30E+00 | −1.93E−02 | −6.91E−02 | −9.19E−03 | −4.07E−02 | −9.75E−05 | −1.06E−03 | — |
| 6 | 3.268 | −4.26E−01 | 5.21E−02 | −2.23E−02 | −2.04E−03 | −2.89E−03 | −2.19E−04 | −4.49E−04 | — |
| 7 | 3.065 | −1.97E−02 | 9.42E−02 | −1.14E−02 | 3.58E−03 | −1.46E−03 | 5.39E−04 | 5.08E−05 | — |
| 8 | 2.969 | −4.25E−01 | 6.71E−02 | −1.91E−02 | 4.91E−03 | −5.86E−04 | 4.22E−04 | 7.50E−05 | — |
| 9 | 2.994 | −9.08E−02 | 6.50E−02 | −2.59E−03 | 4.43E−03 | 8.43E−04 | 3.90E−04 | 1.64E−04 | — |
| 10 | 3.401 | −8.91E−01 | −1.09E−01 | −7.58E−02 | −4.09E−02 | −1.73E−02 | −5.99E−03 | −9.95E−04 | — |
| 11 | 3.919 | −1.22E+00 | −3.47E−02 | 5.74E−02 | 6.97E−03 | −7.23E−03 | −7.36E−03 | −1.88E−03 | — |
| 12 | 4.211 | 1.86E−01 | −3.71E−01 | 1.32E−01 | 1.27E−02 | 7.43E−03 | −8.04E−03 | −1.51E−03 | — |
| 13 | 5.009 | 4.15E−01 | 2.07E−01 | −1.49E−01 | −5.07E−02 | −4.46E−03 | −4.42E−03 | 6.79E−04 | — |
| 14 | 5.294 | −5.98E+00 | 9.61E−01 | −1.17E−01 | −1.06E−01 | 1.71E−02 | 3.16E−03 | −3.61E−03 | 4.85E−13 |
| 15 | 5.742 | −2.61E+00 | 1.38E−01 | 7.93E−02 | −6.44E−02 | 4.43E−02 | −1.21E−02 | 4.68E−03 | −2.59E−12 |
| 16 | 6.892 | 1.74E+00 | 2.75E−01 | −7.65E−02 | 5.97E−02 | −4.52E−02 | 2.19E−02 | −4.98E−03 | 5.01E−04 |
| 17 | 7.155 | −4.54E+00 | 6.92E−01 | −1.73E−01 | 1.23E−01 | −5.81E−02 | 1.97E−02 | −1.03E−02 | 2.91E−03 |

Figure 6:
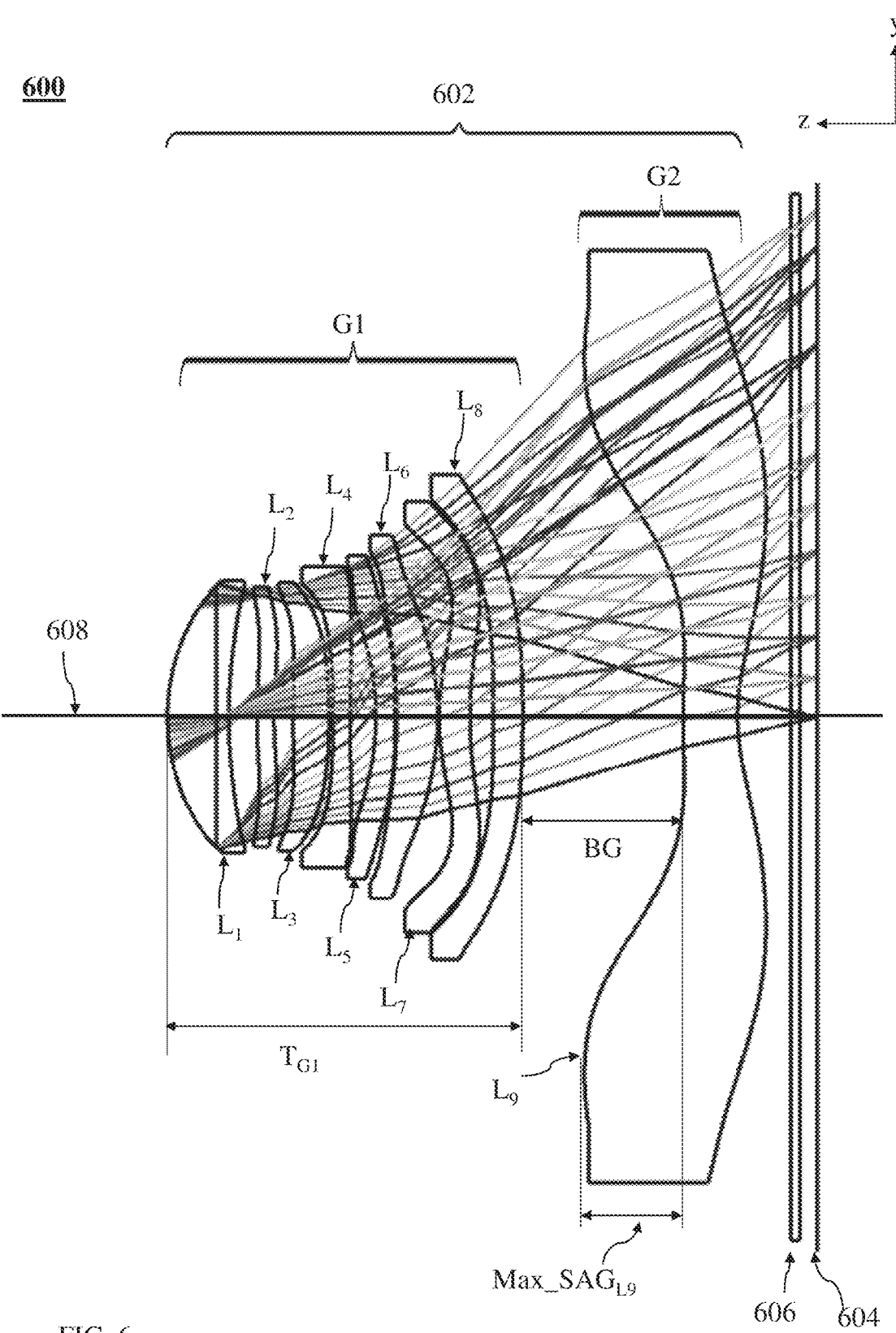
FIG. 6 shows yet another example of a 2G PO optical lens system disclosed herein.

FIG. 6 shows another example of a 2G PO optical lens system disclosed herein and numbered 600. Lens system 600 comprises a PO lens 602 divided into two lens groups G1 and G2 and having a lens optical axis 608, an image sensor 604 and, optionally, an optical element 606. Image sensor 604 may have a SD of 21.5 mm. G1 includes 8 lens elements ($L_1$-$L_8$) and G2 includes 1 lens element ($L_9$). Detailed optical data and surface data for PO lens 602 are given in Tables 7-8. Table 7 provides surface types and Table 8 provides aspheric coefficients.

TABLE 7

Example 600
EFL = 11.256 mm, F number = 2, HFOV = 42.9 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | A.S. | Plano | Infinity | −1.028 | 2.813 | | | | |
| 2 | Lens 1 | QT1 | 4.420 | 1.293 | 2.850 | Glass | 1.48 | 84.1 | 14.902 |
| 3 | | | 10.266 | 0.596 | 2.722 | | | | |
| 4 | Lens 2 | QT1 | 9.842 | 0.363 | 2.709 | Plastic | 1.54 | 55.9 | −208.133 |
| 5 | | | 8.940 | 0.403 | 2.719 | | | | |
| 6 | Lens 3 | QT1 | 33.873 | 0.755 | 2.729 | Plastic | 1.53 | 55.7 | 20.074 |
| 7 | | | −15.669 | 0.088 | 2.807 | | | | |
| 8 | Lens 4 | QT1 | −29.358 | 0.369 | 2.807 | Plastic | 1.61 | 25.6 | −54.209 |
| 9 | | | −237.047 | 0.536 | 3.153 | | | | |
| 10 | Lens 5 | QT1 | −5.733 | 0.396 | 3.185 | Plastic | 1.61 | 25.6 | −7.891 |
| 11 | | | 33.705 | 0.037 | 3.384 | | | | |
| 12 | Lens 6 | QT1 | −49.454 | 0.873 | 3.463 | Plastic | 1.57 | 37.4 | 11.421 |
| 13 | | | −5.789 | 0.030 | 3.807 | | | | |
| 14 | Lens 7 | QT1 | 5.434 | 0.653 | 4.078 | Plastic | 1.54 | 55.9 | 22.295 |
| 15 | | | 9.398 | 0.495 | 4.534 | | | | |
| 16 | Lens 8 | QT1 | −54.524 | 0.619 | 4.563 | Plastic | 1.59 | 28.4 | 125.685 |
| 17 | | | −31.581 | 3.385 | 5.104 | | | | |
| 18 | Lens 9 | QT1 | 14.910 | 1.149 | 8.669 | Plastic | 1.53 | 55.7 | −11.497 |
| 19 | | | 4.246 | 1.118 | 9.855 | | | | |
| 20 | Filter | Plano | Infinity | 0.210 | — | Glass | 1.52 | 64.2 | |
| 21 | | | Infinity | 0.350 | — | | | | |
| 22 | Image | Plano | Infinity | — | — | | | | |

TABLE 8

| | | | Aspheric Coefficients | | | |
|---|---|---|---|---|---|---|
| Surface # | Norm Radius | A0 | A1 | A2 | A3 | A4 | A5 |
| 2 | 3.076 | 7.63E−02 | 3.47E−02 | 1.30E−02 | 2.60E−03 | −1.40E−03 | −2.86E−03 |
| 3 | 2.911 | −2.23E−02 | 3.00E−02 | 6.80E−03 | −9.43E−04 | −3.56E−03 | −3.74E−03 |
| 4 | 2.875 | −6.25E−01 | 6.30E−02 | −5.95E−03 | −7.17E−03 | −6.25E−03 | −4.77E−03 |
| 5 | 2.920 | −7.01E−01 | 8.81E−02 | 1.22E−02 | 4.88E−04 | −1.90E−03 | −2.12E−03 |
| 6 | 2.920 | −5.14E−01 | 7.24E−03 | 2.36E−02 | 7.11E−04 | −1.99E−03 | −1.99E−03 |
| 7 | 2.942 | −3.88E−01 | 3.57E−02 | 8.65E−03 | 1.37E−02 | 6.88E−03 | 3.88E−03 |
| 8 | 2.885 | −4.31E−01 | −4.06E−02 | −4.31E−03 | 1.03E−02 | 5.47E−03 | −1.10E−03 |
| 9 | 3.225 | −3.87E−02 | −5.83E−02 | −6.55E−03 | 3.98E−04 | 1.51E−02 | 6.14E−03 |
| 10 | 3.309 | 5.00E−01 | 4.93E−02 | −6.88E−02 | −1.13E−02 | 1.82E−02 | 8.75E−03 |
| 11 | 3.890 | −1.14E+00 | 6.01E−01 | 7.27E−02 | 1.78E−01 | 2.12E−02 | −2.35E−03 |
| 12 | 4.221 | −7.33E−01 | 2.18E−01 | 2.78E−02 | 1.37E−01 | −1.05E−02 | −1.04E−03 |
| 13 | 4.681 | 1.85E+00 | 1.46E−01 | −3.86E−02 | 5.36E−02 | 7.16E−02 | −1.16E−02 |
| 14 | 5.440 | −7.91E+00 | 2.63E−02 | −4.14E−01 | −3.09E−01 | 1.31E−01 | 1.68E−01 |
| 15 | 6.116 | −6.57E+00 | 7.18E−01 | 1.71E−01 | −2.06E−01 | −3.30E−02 | 7.76E−03 |
| 16 | 6.405 | −5.27E−02 | 2.16E+00 | 4.58E−01 | −1.28E−01 | −4.71E−02 | 9.36E−02 |
| 17 | 6.886 | 9.25E−01 | 2.67E+00 | 8.02E−01 | 1.22E−01 | −4.94E−02 | 5.33E−02 |
| 18 | 10.349 | −2.91E+00 | 4.42E+00 | −2.56E−01 | 1.54E+00 | 2.68E−01 | 2.81E−01 |
| 19 | 10.579 | −5.58E+00 | 2.20E+00 | −8.35E−02 | 5.86E−01 | 2.84E−01 | 3.71E−01 |

| | | | Aspheric Coefficients | | | |
|---|---|---|---|---|---|---|
| Surface # | A6 | A7 | A8 | A9 | A10 | A11 |
| 2 | −2.61E−03 | −1.96E−03 | −1.15E−03 | −5.70E−04 | −2.02E−04 | −3.99E−05 |
| 3 | −2.65E−03 | −1.60E−03 | −7.37E−04 | −2.81E−04 | −8.50E−05 | −1.58E−05 |
| 4 | −2.79E−03 | −9.63E−04 | −1.39E−04 | 1.36E−04 | 8.92E−05 | 3.21E−05 |
| 5 | −6.80E−04 | 1.02E−03 | 1.35E−03 | 1.03E−03 | 4.23E−04 | 1.01E−04 |

TABLE 8-continued

| | | | | | | |
|---|---|---|---|---|---|---|
| 6 | −1.49E−03 | −4.00E−04 | 2.95E−04 | 3.53E−04 | 1.08E−04 | −2.16E−05 |
| 7 | 3.52E−03 | 5.88E−04 | 7.77E−04 | 6.55E−04 | 2.53E−04 | 3.23E−05 |
| 8 | 2.27E−03 | −3.93E−04 | −1.33E−04 | 5.21E−05 | 4.69E−05 | −1.81E−05 |
| 9 | 4.94E−03 | 1.29E−03 | 1.27E−03 | 6.39E−04 | 1.71E−04 | 3.97E−06 |
| 10 | 2.38E−03 | 3.73E−03 | 2.61E−03 | 9.28E−04 | 2.23E−04 | 1.05E−04 |
| 11 | −2.39E−02 | −4.31E−03 | −2.57E−03 | 3.64E−04 | 2.28E−03 | 8.85E−04 |
| 12 | −4.58E−03 | 2.10E−02 | 1.04E−02 | 5.32E−03 | 1.62E−03 | −2.91E−04 |
| 13 | −4.18E−02 | −4.10E−02 | −3.31E−02 | −2.40E−02 | −1.16E−02 | −1.96E−03 |
| 14 | −4.71E−03 | −8.95E−02 | −3.47E−02 | 1.54E−02 | 1.74E−02 | 4.80E−03 |
| 15 | 1.05E−02 | −2.91E−02 | −1.03E−02 | 9.57E−03 | 1.12E−02 | 3.06E−03. |
| 16 | −3.82E−02 | −1.41E−01 | −6.56E−02 | 1.59E−02 | 3.12E−02 | 1.00E−02 |
| 17 | 7.24E−02 | 5.27E−02 | 3.61E−02 | 2.04E−02 | 1.28E−02 | 4.20E−03 |
| 18 | 7.38E−02 | 2.78E−02 | −8.12E−03 | 9.81E−03 | −3.71E−03 | 3.83E−04 |
| 19 | 1.96E−01 | 1.63E−01 | 8.13E−02 | 4.92E−02 | 1.80E−02 | 6.50E−03 |

FIG. 7 shows an example of a 1G PO optical lens system disclosed herein and numbered 700. Lens system 700 comprises a PO lens 702 having a lens optical axis 708, an image sensor 704 and, optionally, an optical element 706. Image sensor 704 may have a SD of 21.5 mm. PO lens 702 includes 6 lens elements ($L_1$-$L_6$). Optical rays pass through lens 702 and form an image on image sensor 704. Detailed optical data and surface data for PO lens 702 are given in Tables 9-10. Table 9 provides surface types and Table 10 provides aspheric coefficients.

As of $L_6$'s lens shape, not the entire BFL can be collapsed, but only a BG expanding from a closest point of $L_6$ to image sensor 706 and to optical element 706 respectively.

TABLE 9

Example 700
EFL = 8.78 mm, F number = 1.40, HFOV = 38.33 deg.

| Surface # | Comment | Type | Curvature Radius | Thickness | Aperture Radius (D/2) | Material | Index | Abbe # | Focal Length |
|---|---|---|---|---|---|---|---|---|---|
| 1 | Lens 1 | QT1 | 4.062 | 0.970 | 3.467 | Plastic | 1.661 | 20.373 | −63.86 |
| 2 | | | 3.354 | 0.625 | 3.181 | | | | |
| 3 | Lens 2 | QT1 | 4.987 | 0.472 | 3.120 | Plastic | 1.636 | 23.972 | 8.74 |
| 4 | | | 44.027 | 0.012 | 3.173 | | | | |
| 5 | Lens 3 | QT1 | 7.765 | 0.349 | 3.148 | Plastic | 1.681 | 18.154 | −9.13 |
| 6 | | | 3.409 | 0.209 | 3.129 | | | | |
| 7 | Lens 4 | QT1 | 11.586 | 1.936 | 3.133 | Plastic | 1.545 | 55.987 | 9.19 |
| 8 | | | −8.331 | 0.324 | 3.087 | | | | |
| 9 | Lens 5 | QT1 | −3.242 | 0.704 | 3.023 | Plastic | 1.671 | 19.243 | −117.87 |
| 10 | | | −3.676 | 0.010 | 2.916 | | | | |
| 11 | Lens 6 | QT1 | 4.098 | 1.639 | 3.750 | Plastic | 1.671 | 19.243 | 31.38 |
| 12 | | | 4.256 | 4.767 | 4.004 | | | | |
| 13 | Filter | Plano | Infinity | 0.21 | — | Glass | 1.517 | 64.167 | |
| 14 | | | Infinity | 0.35 | — | | | | |
| 15 | Image | Plano | Infinity | — | — | | | | |

TABLE 10

Aspheric Coefficients

| Surface # | Rnorm | A0 | A1 | A2 | A3 | A4 | A5 | A6 | A7 |
|---|---|---|---|---|---|---|---|---|---|
| 1 | 3.40E+00 | −8.56E−01 | −1.71E−01 | −4.34E−04 | 3.84E−03 | 4.25E−03 | −6.06E−04 | −2.01E−04 | −7.38E−05 |
| 2 | 3.23E+00 | −1.31E+00 | −2.82E−01 | −7.32E−03 | −4.84E−03 | −2.64E−03 | −5.08E−03 | −1.40E−03 | 2.44E−04 |
| 3 | 3.11E+00 | −6.06E−01 | −1.83E−01 | 6.00E−02 | 5.05E−03 | −1.05E−02 | 1.70E−03 | −2.52E−04 | 6.47E−04 |
| 4 | 3.21E+00 | 4.18E−01 | −3.66E−01 | 1.07E−01 | −3.43E−02 | 7.45E−03 | 2.48E−03 | −6.57E−04 | −3.44E−04 |
| 5 | 3.19E+00 | −5.98E−02 | −1.12E−01 | 2.81E−02 | −3.70E−02 | 2.66E−02 | −7.02E−03 | 1.75E−03 | −1.70E−03 |
| 6 | 3.20E+00 | −1.22E+00 | −3.95E−02 | −2.72E−02 | −4.09E−02 | 1.10E−02 | −8.08E−03 | 2.00E−03 | −9.20E−04 |
| 7 | 3.22E+00 | 3.90E−01 | −9.35E−02 | 2.18E−02 | −1.38E−02 | 1.20E−02 | −1.74E−03 | −8.65E−04 | 4.55E−04 |
| 8 | 3.16E+00 | −6.74E−02 | 9.85E−02 | −3.83E−02 | 1.08E−02 | −1.20E−04 | 2.42E−03 | 2.93E−04 | −8.65E−05 |
| 9 | 3.16E+00 | 1.66E+00 | 2.02E−01 | 4.31E−02 | 1.42E−02 | −4.98E−04 | 5.70E−03 | 9.36E−04 | 5.32E−04 |

TABLE 10-continued

| | | | | | Aspheric Coefficients | | | | |
|---|---|---|---|---|---|---|---|---|---|
| Surface # | Rnorm | A0 | A1 | A2 | A3 | A4 | A5 | A6 | A7 |
| 10 | 3.31E+00 | 1.42E+00 | 5.34E−02 | −3.06E−02 | −6.58E−02 | −3.57E−02 | −1.17E−02 | −3.51E−03 | −3.31E−04 |
| 11 | 3.90E+00 | −1.59E+00 | −3.41E−02 | −4.06E−02 | −2.22E−02 | −3.16E−03 | −2.06E−03 | −2.74E−04 | −2.70E−04 |
| 12 | 4.31E+00 | −2.16E+00 | −2.36E−01 | −1.46E−01 | −6.35E−02 | −2.21E−02 | −5.76E−03 | −1.77E−03 | 1.09E−04 |

Table 11 shows the values and ranges of optical lens systems 300, 400, 500, 600 and 700 disclosed herein.

SD, TTL, c-TTL, BG, c-BG, BFL, c-BFL, EFL, $EFL_{G1}$, $EFL_{G2}$, $T_{G1}$, $T_{G2}$, $T_{Lens}$, $f_5$, $f_6$, $f_9$, $AGT_{1.4-1.5}$, Max_ SAG given in mm; Half-field-of-view ("HFOV") is given in degrees and f number ("f/#") are given without units.

Image sensor 304, Image sensor 404, Image sensor 504 and Image sensor 604 may have a SD of 21.5 mm ("4/3″ sensor" or "1/0.8″ sensor").

$AGT_{1.4-1.5}$ represents an average thickness of an air gap between $L_4$ and $L_5$. "Average thickness" means here an average of a distance between $L_4$ and $L_5$ considering all y-values from 0 (i.e. from an optical axis such as optical axis 308) to D/2 (i.e. a highest lens margin).

$c\text{-}BG_{MIN}$ and $c\text{-}BG_{MAX}$ represent a minimum and a maximum value of collapsed BG respectively. c-BG may have any value between $c\text{-}BG_{MIN}$ and $c\text{-}BG_{MAX}$.

$c\text{-}BFL_{MIN}$ and $c\text{-}BFL_{MAX}$ represent a minimum and a maximum value of collapsed BFL respectively. c-BFL may have any value between $c\text{-}BFL_{MIN}$ and $c\text{-}BFL_{MAX}$.

$c\text{-}TTL_{MIN}$ and $c\text{-}TTL_{MAX}$ represent a minimum and a maximum value of a collapsed TTL respectively. c-TTL may have any value between $c\text{-}TTL_{MIN}$ and $c\text{-}TTL_{MAX}$.

$T_{Lens}$, $T_{G1}$ and $T_{G2}$ represent a center thickness of a lens or of G1 and G2 respectively. A center thickness is measured at a lens optical axis.

$f_5$, $f_6$ and $f_9$ refers to a focal length of $L_5$, $L_6$ and $L_9$ respectively.

TABLE 11

| Feature/Example | 300 | 400 | 500 | 600 | 700 |
|---|---|---|---|---|---|
| Type | 2G | 2G | 1G | 2G | 1G |
| N | 9 | 9 | 8 | 9 | 6 |
| EFL | 11.58 | 11.51 | 11.53 | 11.26 | 8.78 |
| TTL | 14.60 | 14.19 | 13.57 | 13.72 | 13.58 |
| $c\text{-}TTL_{MIN}$ | 9.94 | 10.60 | 10.42 | 10.53 | 9.26 |
| $c\text{-}TTL_{MAX}$ | 13.75 | 13.90 | 13.22 | 13.33 | 13.06 |
| BG | 4.86 | 3.79 | | 3.39 | 4.52 |
| $c\text{-}BG_{MIN}$ | 0.20 | 0.20 | | 0.20 | 0.20 |
| $c\text{-}BG_{MAX}$ | 4.00 | 3.50 | | 3.00 | 4.00 |
| BFL | | | 3.35 | | 5.33 |
| $c\text{-}BFL_{MIN}$ | | | 0.20 | | 0.75 |
| $c\text{-}BFL_{MAX}$ | | | 3.00 | | 3.00 |
| HFOV | 41.35 | 43.91 | 41.86 | 42.90 | 38.33 |
| SD | 21.50 | 21.50 | 20.99 | 21.50 | 13.90 |
| f/# | 2.00 | 1.91 | 1.68 | 2.00 | 1.40 |
| $EFL_{G1}$ | 9.80 | 10.31 | | 10.14 | |
| $EFL_{G2}$ | −9.60 | −12.78 | | −11.50 | |
| $T_{G1}$ | 7.25 | 7.76 | | 7.50 | |
| $T_{G2}$ | 1.60 | 1.15 | | 1.15 | |
| $T_{Lens}$ | | | 10.30 | | 8.5 |
| f5 | −11.50 | −7.88 | | −7.89 | |
| f6 | 6.50 | 7.60 | | 11.42 | |
| f9 | −9.90 | −12.79 | | −11.50 | |
| T8 | 0.72 | 0.70 | | 0.62 | |
| T9 | 0.87 | 1.15 | | 1.15 | |
| Max. SAGL8 | −3.80 | | | | |
| Max. SAGL9 | −3.50 | 2.20 | | 2.08 | |

TABLE 11-continued

| Feature/Example | 300 | 400 | 500 | 600 | 700 |
|---|---|---|---|---|---|
| AGT (L4-L5) | 0.20 | | | | |
| Max. SAGL8/T8 | −5.25 | | | | |
| Max. SAGL9/T9 | −4.04 | | | | |
| EFLG1/EFL | 0.85 | 0.90 | | 0.90 | |
| EFLG2/EFL | −0.83 | −1.11 | | −1.02 | |
| EFLG1/EFLG2 | −1.02 | −0.81 | | −0.88 | |
| TG1/TG2 | 4.53 | 6.76 | | 6.53 | |
| f9/EFLG2 | 1.03 | 1.00 | | 1.00 | |
| EFL/f6 | 1.78 | 1.51 | | 0.99 | |
| AGT/TTL | 0.01 | | | | |
| TTL/SD | 0.68 | 0.66 | 0.65 | 0.64 | 0.98 |
| $c\text{-}TTL_{MIN}$/SD | 0.46 | 0.49 | 0.50 | 0.49 | 0.67 |
| $c\text{-}TTL_{MAX}$/SD | 0.64 | 0.65 | 0.63 | 0.62 | 0.94 |
| BFL/TTL | | | 0.25 | | 0.39 |
| BFL/$c\text{-}TTL_{MIN}$ | | | 0.32 | | 0.58 |
| BFL/$c\text{-}TTL_{MAX}$ | | | 0.25 | | 0.41 |
| BG/TTL | 0.33 | 0.27 | | 0.25 | 0.33 |
| BG/$c\text{-}TTL_{MIN}$ | 0.49 | 0.36 | | 0.32 | 0.49 |
| BG/$c\text{-}TTL_{MAX}$ | 0.35 | 0.27 | | 0.25 | 0.35 |
| $c\text{-}TTL_{MIN}$/TTL | 0.68 | 0.75 | 0.77 | 0.77 | 0.68 |
| $c\text{-}TTL_{MAX}$/TTL | 0.94 | 0.98 | 0.97 | 0.97 | 0.96 |
| $c\text{-}TTL_{MIN}$/EFL | 0.86 | 0.92 | 0.90 | 0.94 | 1.05 |
| $c\text{-}TTL_{MAX}$/EFL | 1.21 | 1.15 | | 1.18 | 1.49 |

Figures 8A, 8B:
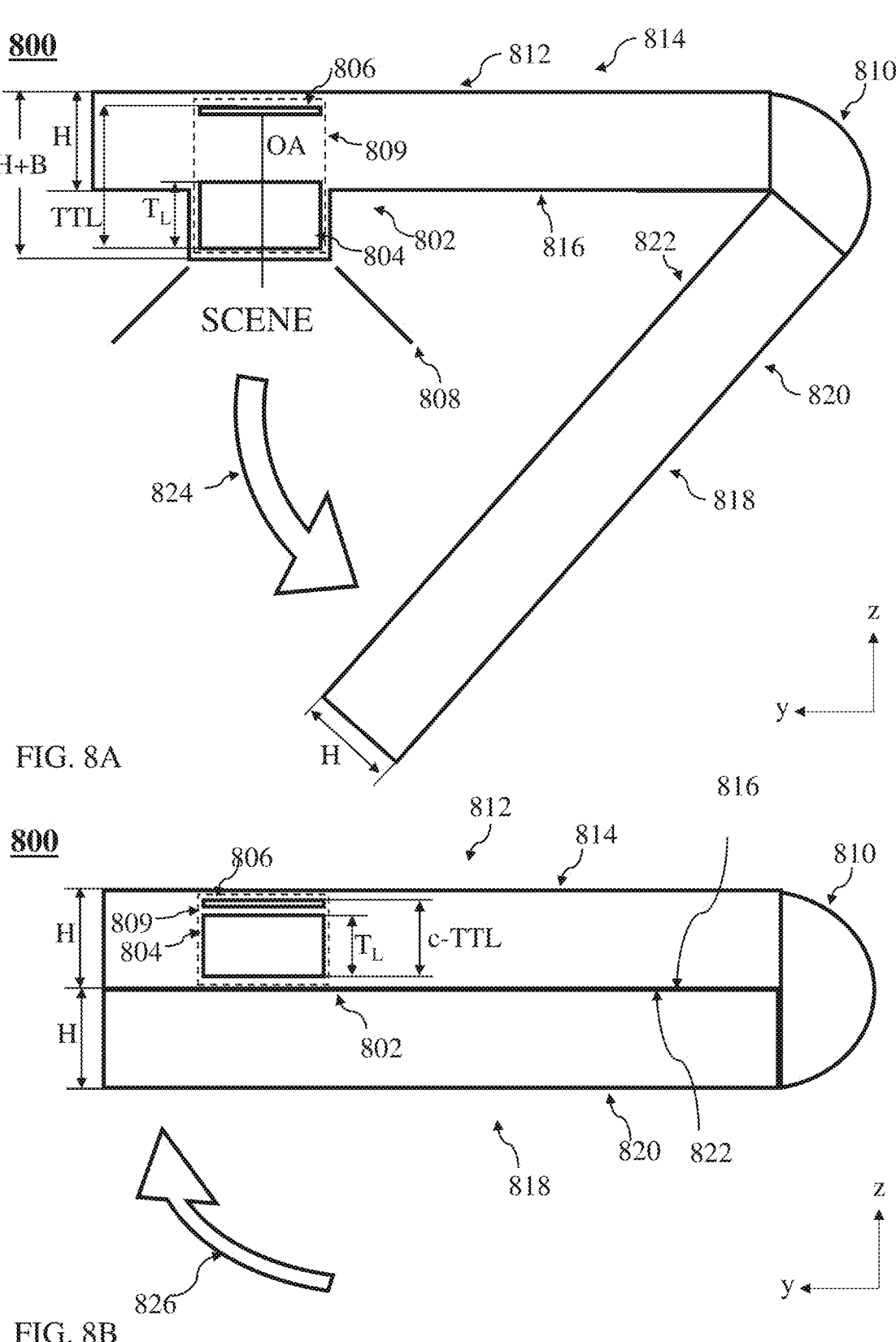
FIG. 8A shows a foldable phone including a passive PO camera as disclosed herein in a partly unfolded state in a cross-sectional side view.
FIG. 8B shows the foldable phone of FIG. 8A in a folded state in a cross-sectional side view.

FIGS. 8A-B shows exemplarily a foldable phone ("FP") 800 including an inner passive POC 802 as disclosed herein. "Inner" means here that a FOV 808 of camera 802 is located at a same side of FP 800 as its "primary screen". The primary screen is a largest screen (i.e. having a largest screen area) included in FP 800. FP 800 includes a hinge axis 810 that connects a first wing 812 with a second wing 818 and which is operational to allow unfolding and folding FP 800. Hinge axis 810 is oriented perpendicular to the x-y plane. First wing 812 includes a first outer (or "world-facing") side 814 and a first inner (or "user-facing") side 816. Second wing 818 includes a second outer side 820 and a second inner side 822. In general, the primary screen of FP 800 expands over both first inner side 816 and second inner side 822. When FP 800 is unfolded, the primary screen can be used in its entirety and inner passive POC 802 is operational (or "active") as user-facing (or "selfie") camera. In some examples, first outer side 814 and/or second outer side 820 also include a screen. When FP 800 is folded, an aperture of inner passive POC 802 is covered by second wing 818. Inner passive POC 802 includes a passive PO actuator (FIG. 8C), a PO lens 804 having lens optical axis ("OA") a lens thickness $T_L$ and an image sensor 806. Inner passive POC 802 is included in, and surrounded by a camera module housing (or simply "camera housing") 809.

FIG. 8A shows FP 800 in a partly unfolded state, in which passive POC 802 is in a PO state. In the PO state, inner passive POC 802 has a TTL and is active as a camera, i.e. PO lens 804 is operational to image a crisp (or clear) image of a scene onto image sensor 806. In the PO state, a height of camera housing 809 ("$H_C$") is defined by TTL and a mechanical "penalty" ("p"), $H_C$=TTL+p, wherein p may be in the range of 0.5 mm-5 mm. A low $H_C$ is beneficial for use in slim mobile devices such as smartphones. Here and in the following, $H_C$, TTL and p are measured along the z-axis.

FIG. 8B shows the FP 800 in a folded state. In the folded state, inner passive POC 802 is in a collapsed state. In the collapsed state, the passive POC has a c-TTL<TTL and is not active as a camera. An unfolding movement to switch between the folded state (FIG. 8B) and the unfolded state (FIG. 8A) is indicated by arrow 824. A folding movement to switch between the partly unfolded state (FIG. 8A) and the folded state (FIG. 8B) is indicated by arrow 826. The unfolding and folding movements are in general performed manually by a user. A height ("H") of each of first wing 812 and second wing 818 is shown. First wing 812 has a regular region having a height ("H") and a bump region having an elevated height H+B, wherein "B" is a bump height. The bump region extrudes from first inner side 816. Inner passive POC 802 is integrated in the bump region, and inner passive POC 802 receives light from a scene facing first inner side 816. In the collapsed state, camera housing 809 has a collapsed height ("c-$H_C$")<$H_C$ which is defined by c-$H_C$=c-TTL+p. c-$H_C$≤H, so that in the collapsed state no camera bump is present. In other examples, in the collapsed state a reduced camera bump may be present. "Reduced" means here that a camera bump has a lower B compared to the PO state. Here and in the following, H, B, c-Hc and c-TTL are measured along the z-axis.

FIG. 8C shows a zoom-in section 830 of FP 800 in a folded state and with inner passive POC 802 in a collapsed state. Section 830 shows a passive PO actuator 832 as disclosed herein. Passive PO actuator 832 includes a spring 834. At an upper end, spring 834 is fixedly attached to first outer side 814, or more general, to a component included in first wing 812 which does not move relative to first wing 812. At a lower end, spring 834 is fixedly attached to a PO lens barrel including PO lens 804. In the collapsed state, spring 834 stores a kinetic energy and is operational to provide a spring force as indicated by arrow 836, i.e. spring 834 is loaded. When a user unfolds FP 800, spring 834 relaxes and the spring force actuates (or "pops out") inner passive POC 802, i.e. inner passive POC 802 is switched to the PO state. When a user folds FP 800, spring 834 is compressed and loaded, so that inner passive POC 802 is switched to the collapsed state. We note that when FP 800 is folded by a user, simultaneously passive POC 802 is switched from a PO state to a collapsed state. When FP 800 is unfolded by a user, simultaneously passive POC 802 is switched from a collapsed state to a PO state. As desired for mobile devices such as FPs, no active actuation is required.

In some examples, a mechanical spring may be used, as shown here. In other examples, a magnetic spring may be used. A magnetic spring may include a magnet and a yoke, or alternatively, two magnets. Such magnetic springs are for example described in co-owned international patent application No. PCT/IB2022/052194 and No. PCT/IB2023/054411.

Figures 9A, 9B:
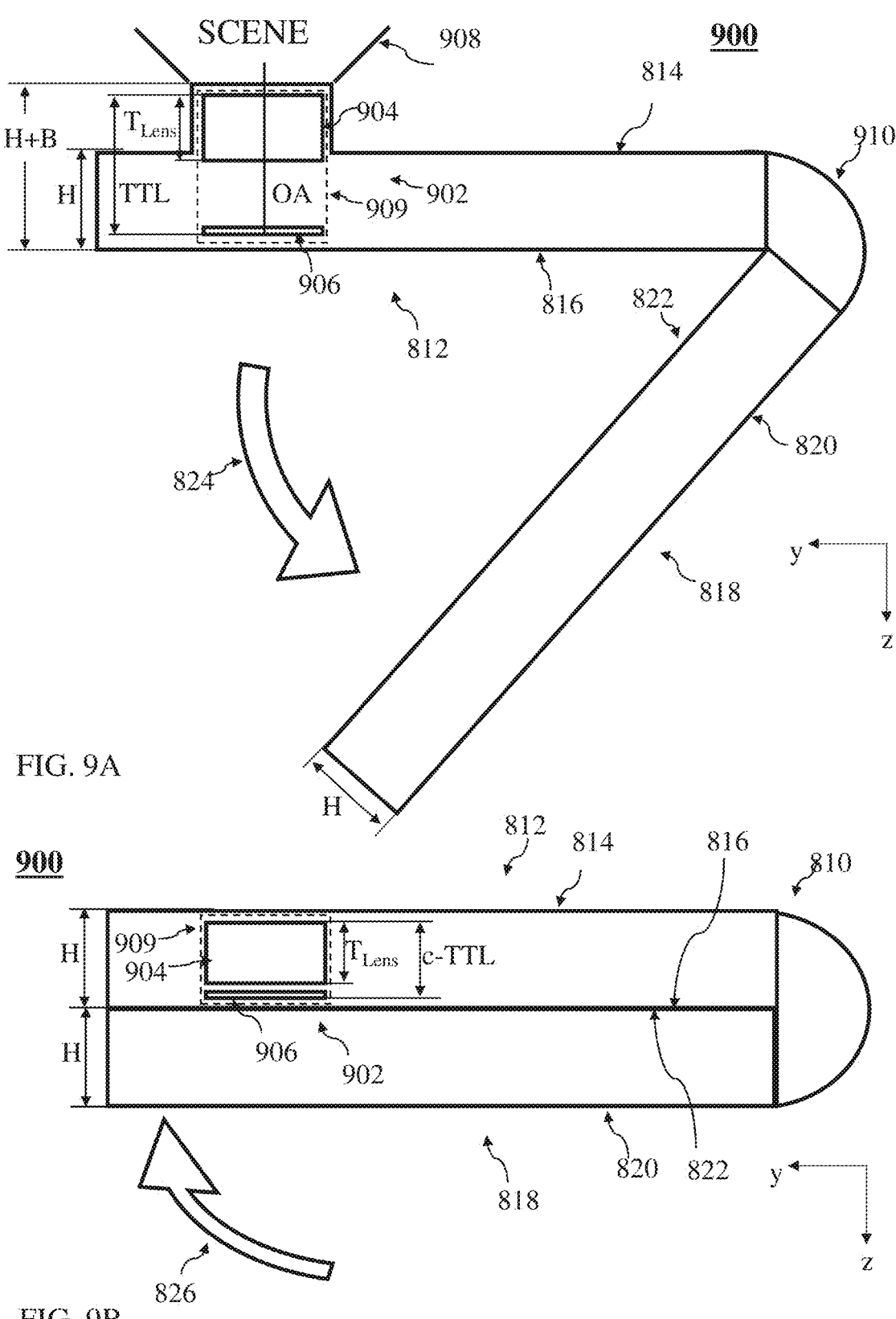
FIG. 9A shows another foldable phone including a passive PO camera as disclosed herein in a partly unfolded state in a cross-sectional side view.
FIG. 9B shows the foldable phone of FIG. 9A in a folded state in a cross-sectional side view.

FIGS. 9A-B shows exemplarily a FP 900 including an outer passive POC 902 as disclosed herein. "Outer" means here that a FOV 908 of passive POC 902 is located at an opposite side of FP 900's primary screen. FP 900 includes all components as described in FIGS. 8A-B, except of a different passive POC. Both in FP 900's folded state and in its unfolded state, an aperture of outer passive POC 902's FOV 908 receives light from a scene. Outer passive POC 902 includes a passive PO actuator (FIG. 9C), a PO lens 904 and an image sensor 906. Outer passive POC 902 is included in a camera housing 909.

FIG. 9A shows FP 900 in a partly unfolded state, with outer passive POC 902 in a PO state. The bump region extrudes from first outer side 814. Outer passive POC 902 is integrated in the bump region and receives light from a scene facing first outer side 814.

FIG. 9B shows the FP 900 in a folded state, with outer passive POC in a collapsed state.

FIG. 9C shows a zoom-in section 930 of FP 900 in a folded state and with outer passive POC 902 in a collapsed state. Section 930 shows a passive PO actuator 932 as disclosed herein and including a magnetic spring 940. Magnetic spring 940 includes a first magnet 942 fixedly attached to a PO lens barrel including PO lens 804 and a second magnet 944 fixedly attached to second wing 818. First magnet 942 and second magnet 944 are selected and oriented so that they attract each other. In the collapsed state, first magnet 942 and second magnet 944 are relatively close to each other, so that a magnetic energy is stored and magnetic spring 940 is operational to provide a magnetic spring force as indicated by arrow 946. The magnetic spring force collapses outer passive POC 902. When a user unfolds FP 900, magnetic spring 940 relaxes and no magnetic spring force is provided. Another spring included in outer passive POC 902 may provide a spring force to pop out outer passive POC 902, i.e. outer passive POC 902 is switched to the PO state. First magnet 942 and second magnet 944 are relatively distant from each other. When a user folds FP 900, first magnet 942 and second magnet 944 approach each other again, and outer passive POC 902 is switched to the collapsed state. We note that when FP 900 is folded by a user, simultaneously outer passive POC 902 is switched from the PO state to the collapsed state. When FP 900 is unfolded by a user, simultaneously outer passive POC 902 is switched from the collapsed state to the PO state. As desired for mobile devices such as FPs, no active actuation is required.

Figures 10A, 10B:
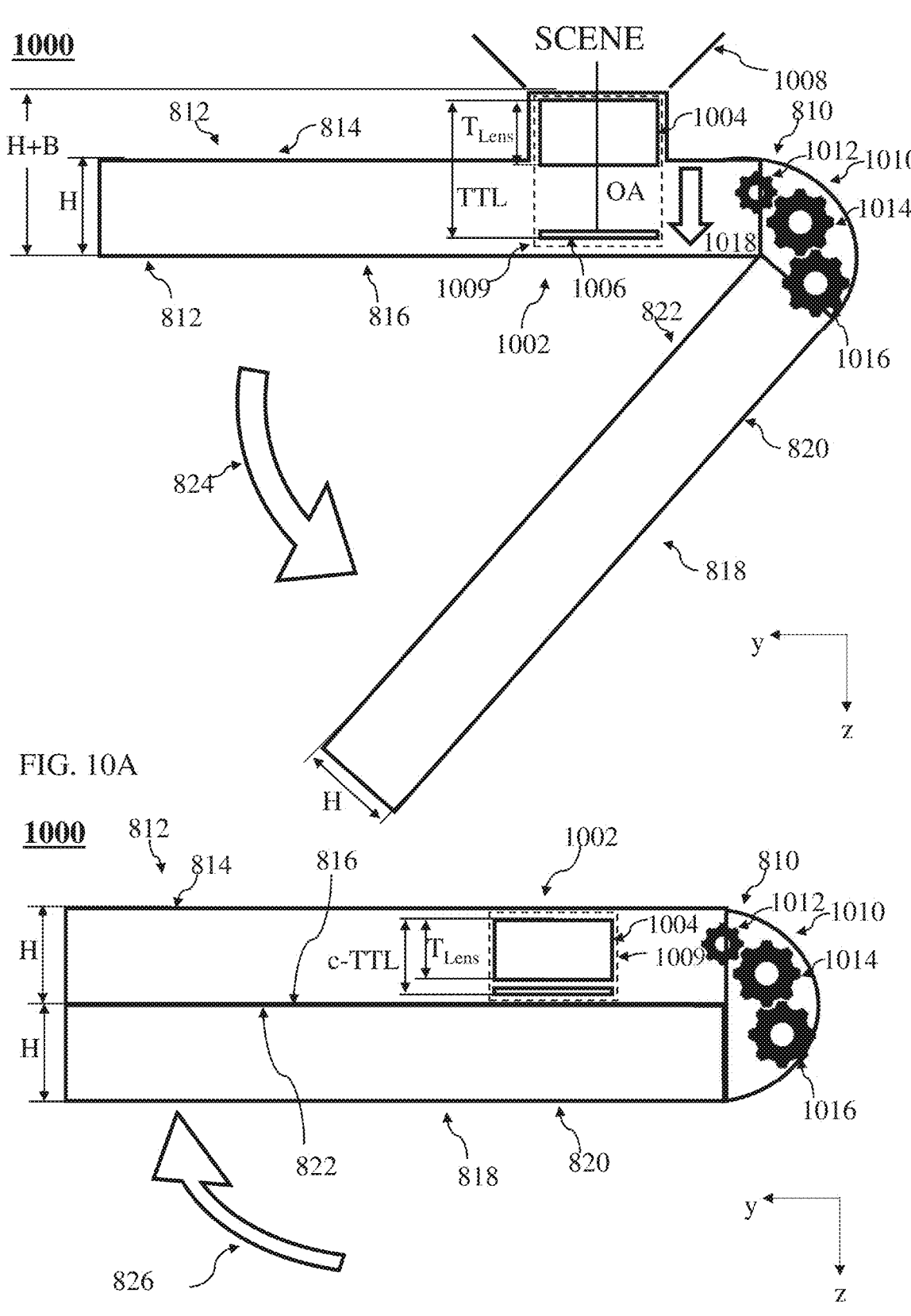
FIG. 10A shows another foldable phone including a passive PO camera as disclosed herein in a partly unfolded state in a cross-sectional side view.
FIG. 10B shows the foldable phone of FIG. 10A in a folded state in a cross-sectional side view.

FIGS. 10A-B show exemplarily a FP 1000 including an outer passive POC 1002 as disclosed herein. FP 1000 includes all components as described in FIGS. 8A-B, except of a different passive POC. Outer passive POC 1002 includes a passive PO actuator 1010 as disclosed herein, a PO lens 1004, an image sensor 1006 and is included in a camera housing 1009.

FIG. 10A shows FP 1000 in a partly unfolded state, with passive POC 1002 in a PO state.

FIG. 10B shows the FP 1000 in a folded state, with passive POC in a collapsed state. The bump region extrudes from first outer side 814. Outer passive POC 1002 is integrated in the bump region and receives light from a scene facing first outer side 814. PO actuator 1010 includes a plurality of O gear wheels (here, O=3), a first gear wheel 1012, a second gear wheel 1014 and a third gear wheel 1016. PO actuator 1010 is located at, or in proximity of, hinge axis 810. For example, PO actuator 1010 may be located at a distance of up to 25 mm from hinge axis 810. In fact, also outer passive POC 1002 is located relatively close to hinge axis 810. For example, POC 1002 may be located at a distance of up to 50 mm from hinge axis 810. PO actuator 1010 uses a movement such as an unfolding movement indicated by arrow 824 or a folding movement indicated by arrow 826 to switch outer passive POC 1002 from the PO state to the collapsed state as indicated by arrow 1018, and vice versa. I.e., PO actuator 1010 translates a rotational unfolding or folding movement of first wing 812 and second wing 818 around hinge axis 810 into a linear movement along the z-axis of a PO lens barrel including PO lens 804 and relative to image sensor 806. We note that when FP 1000 is folded by a user, simultaneously outer passive POC 1002 is switched from a PO state to a collapsed state. When FP 1000 is unfolded by a user, simultaneously outer passive POC 1002 is switched from a collapsed state to a PO state. As desired for mobile devices such as FPs, no active actuation is required.

Figures 11A, 11B:
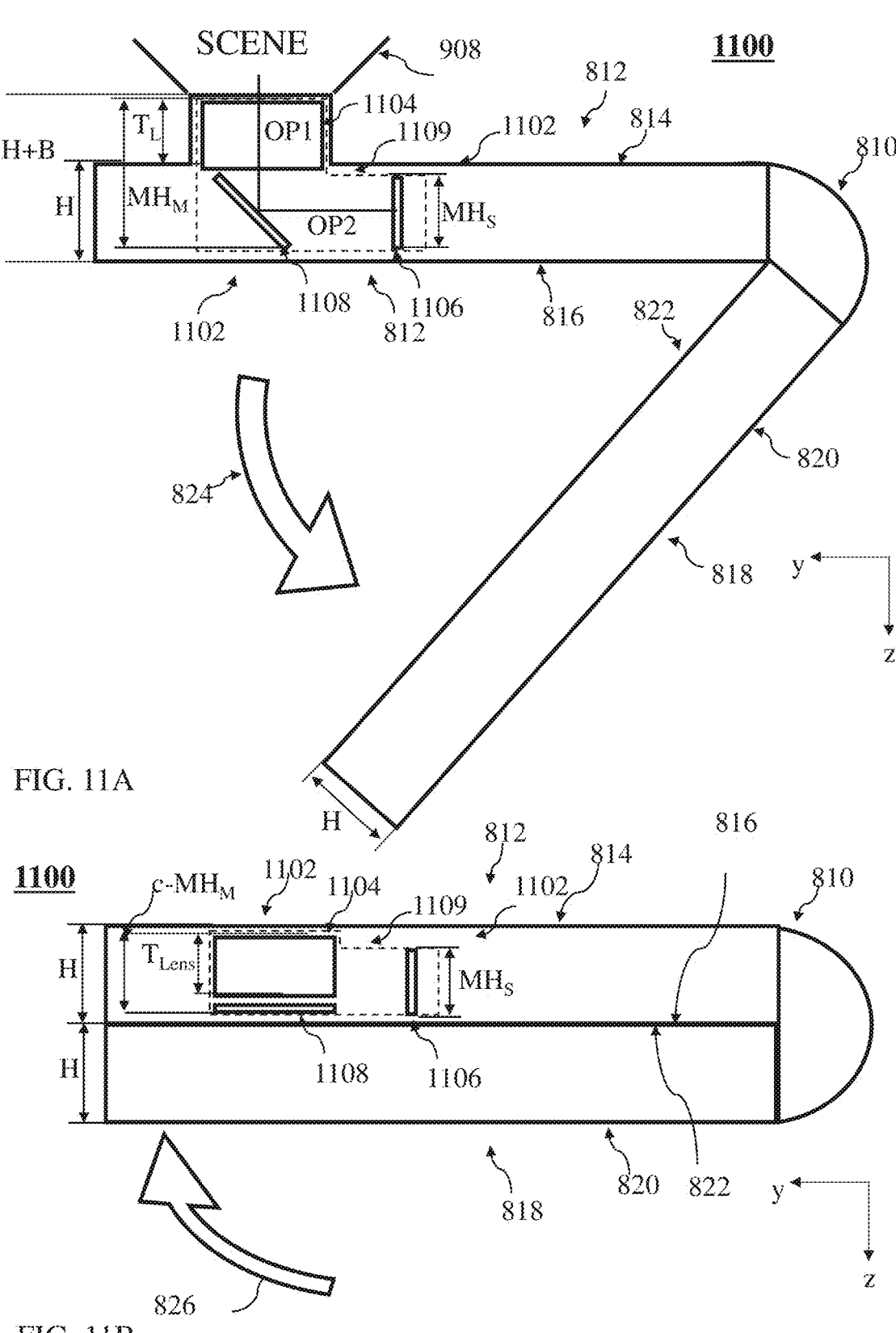
FIG. 11A shows another foldable phone including a passive PO camera as disclosed herein in a partly unfolded state in a cross-sectional side view.
FIG. 11B shows the foldable phone of FIG. 11A in a folded state in a cross-sectional side view.

FIGS. 11A-B show exemplarily a FP 1100 including an outer passive POC 1102 as disclosed herein. FIG. 11A shows FP 1100 in a partly unfolded state, with outer passive POC 1102 in a PO state. FP 1100 includes all components as described in FIGS. 8A-B, except of a different passive POC. Outer passive POC 1102 receives light from a scene facing first outer side 814. In the PO state, outer passive POC 1102 is operational as a folded camera as known in the art. Outer passive POC 1102 includes a passive PO actuator (not shown), a lens 1104, a mirror 1108, an image sensor 1106 and is included in a camera housing 1109. Outer passive POC 1102 is operational to receive light along a first optical path ("OP1") parallel to the z-axis. An OA of lens 1104 is parallel to OP1. In the PO state, mirror 1108 is oriented at an angle of about 45 degrees with respect to the z-axis, so that reflected light propagates along a second optical path ("OP2") parallel to the z-axis and towards image sensor 1106. Lens 1104 is located at an object side of mirror 1108, what provides a relatively low f/#for a given camera height, as beneficial for use in mobile devices such as FPs. Such cameras are for example described in co-owned international patent application No. PCT/IB2022/055745. In the PO state, camera housing 1109 has a first elevated ("module") region including PO lens 1104 and mirror 1108, as well as a second ("shoulder") region including image sensor 1106. The module region has a minimum module height ("$MH_M$") defined by a sum of $T_L$, a height of mirror 1108, and an air gap of about 0.1 mm-2.5 mm between PO lens 1104 and mirror 1108. A height of the module region of camera housing 1009 ("$H_M$") measured along the z-axis is defined by $MH_M$ and a mechanical "penalty" ("p"), $H_M=MH_M+p$, wherein p may be in the range of 0.5 mm-5 mm. The shoulder region has a minimum shoulder height ("$MH_S$")<$MH_M$ and which is defined by a height of image sensor 1106 measured along the z-axis. A height of the shoulder region of camera housing 1009 ("$H_S$") measured along the z-axis is defined by $MH_S$ and a mechanical "penalty" ("p"), $H_S=MH_S+p$, wherein p may be in the range of 0.5 mm-5 mm. A low $H_M$ and a low $H_S$ are beneficial for use in slim mobile devices such as smartphones. As $H_S<H_M$, the shoulder region can be integrated into the regular region of height H. Only the module region is integrated in the bump region. In other words, outer passive POC 1102 is only partially integrated in the bump region, what is beneficial for achieving a relatively small bump region. Here and in the following, a height, an air gap, $MH_M$, $H_M$, $MH_S$, $H_S$ and p are measured along the z-axis.

FIG. 11B shows the FP 1100 in a folded state, with outer passive POC 1102 in a collapsed state. For switching from the PO state to the collapsed state, PO lens 1104 is linearly moved towards second wing 818. Mirror 1108 is rotationally moved by about 45 degrees around an axis perpendicular to OP1 and OP2 so that it forms an angle of about 0 degrees with the y-axis, and in addition it is linearly moved towards second wing 818. "About" means here for example a variation of 10 degrees or ±5 degrees. The respective movements are performed so that MHM is collapsed to a c-$MH_M<MH_M$, and $H_M$ is collapsed to a c-$H_M<H_M$, given by c-$H_M=$c-$MH_M+p$. c-$H_M\leq H$, so that in the collapsed state no camera bump is required. $MH_S$ does not change. For providing an actuation of the respective movements of PO lens 1104 and mirror 1108, outer passive POC 1102 may include a passive PO actuator such as passive PO actuator 932 (FIG. 9C) including a magnetic spring or it may include a passive PO actuator such as passive PO actuator 1010 (FIGS. 10A-B) including a plurality of gear wheels.

Figure 12:
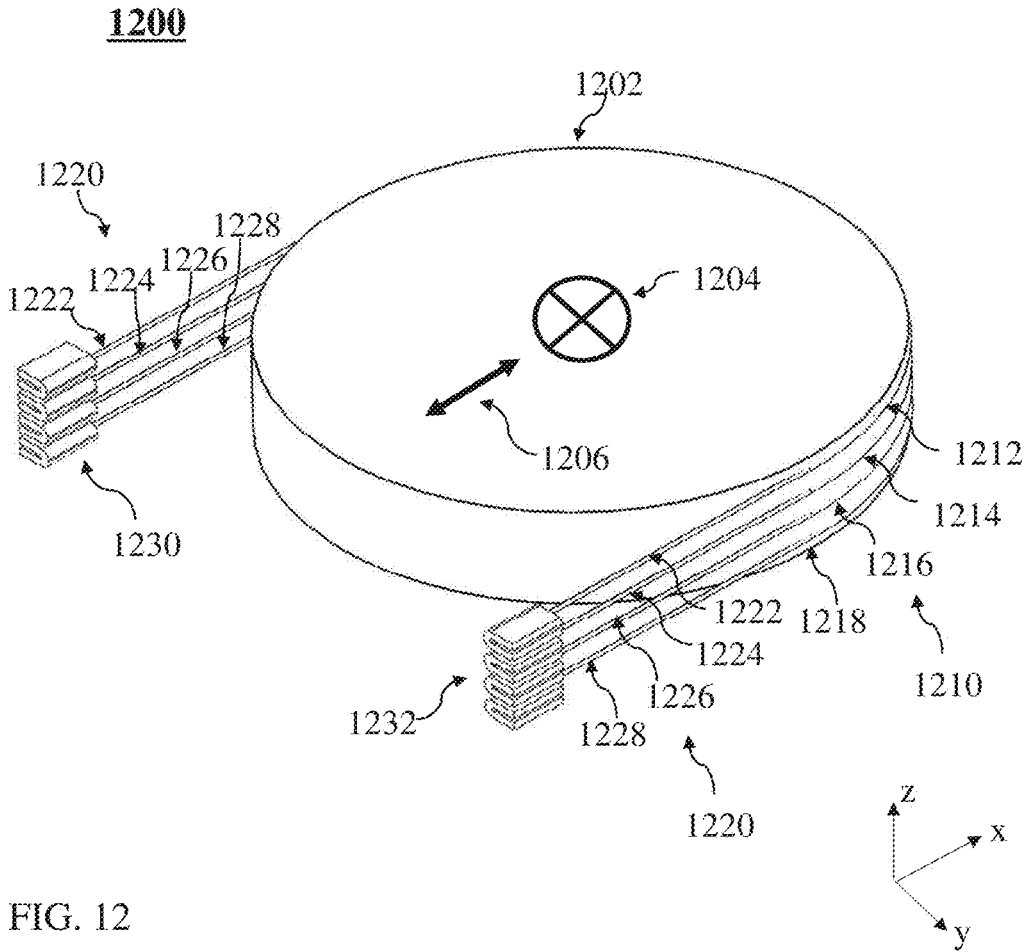
FIG. 12 shows a shape memory alloy actuator as disclosed herein in a perspective view.

FIG. 12 shows a SMA actuator 1200 as disclosed herein. SMA actuator 1200 is operational for (or "over") a relatively large number of cycles (for an example see below) and for use in a camera of a mobile device such as a smartphone. SMA actuator 1200 includes a moving element 1202 which is operational to move relative to a mobile device including moving element 1202, for example for switching a POC from a PO state and a collapsed state and vice versa, for focusing a lens or for movements of a lens or an image sensor for optical image stabilization (OIS). Moving element 1202 includes a plurality of P rails 1210 (here, P=4), a first rail 1212, a second rail 1214, a third rail 1216 and a fourth rail 1218. SMA actuator 1200 includes a plurality of P SMA wires 1220 (here, P=4), a first SMA wire 1222, a second SMA wire 1224, a third SMA wire 1226 and a fourth SMA wire 1228. Each of the P SMA wires 1220 is located in and guided by one of the P rails 1210. A preload force is applied between P SMA wires 1220 and P rails 1210, so that P SMA wires 1220 do not detach (or "derail") from moving element 1202. SMA actuator 1200 also includes a first plurality of P crimps 1230 and a second plurality of P crimps 1232. I.e. overall, SMA actuator 1200 includes 2P crimps. Each of the crimps included in first plurality of P crimps 1230 and second plurality of P crimps 1232 is fixedly attached to one end of each SMA wire included in P SMA wires 1220, as shown. The crimps provide a mechanical and electrical connection. In other examples, a plurality of P rails and P SMA wires respectively may include P=2-25.

A movement of moving element 1202 may be a rotational movement along a rotation axis 1204 parallel to the z-axis. Rotation axis 1204 may be located at a center of moving element 1202. In other examples, a movement of moving element 1202 may be a linear movement in the x-y plane, as indicated by arrow 1206. For actuating such linear or rotational movement, SMA actuator 1200 is operational to drive a current through one of P SMA wires 1220. I.e., during actuation, only one of P SMA wires 1220 is operated. In other words, SMA actuator 1200 operates P SMA wires 1220 consecutively. For example, during a first period of time, only first SMA wire 1222 is operated, during a second period of time, only second SMA wire 1224 is operated, during a third period of time, only third SMA wire 1226 is operated and during a fourth period of time, only fourth SMA wire 1228 is operated. This can be beneficial to extend (or prolong) a number of cycles SMA actuator 1200 is operational. For example, a single SMA wire may be operational under load for M cycles, but a specification of a SMA actuator may require operation over P×M cycles. By consecutively operating P SMA wires as detailed above, the specification of P×M cycles can be satisfied. For example, a single SMA wire such as first SMA wire 1222 may be operational under load for M=twenty-five thousand (25,000) cycles, but a specification of SMA actuator 1200 may require operation over 4×M=hundred thousand (100,000) cycles. By consecutively operating four SMA wires 1220 as detailed above, the specification of hundred thousand (100, 000) cycles can be satisfied. In this example, a relatively large number of cycles is hundred thousand (100,000) cycles. In other examples, a relatively large number of cycles may be in the range of five thousand (5,000) cycles to five hundred thousand (500,000) cycles.

While this disclosure has been described in terms of certain examples and generally associated methods, alterations and permutations of the examples and methods will be apparent to those skilled in the art. The disclosure is to be understood as not limited by the specific examples described herein, but only by the scope of the appended claims.

It is appreciated that certain features of the presently disclosed subject matter, which are, for clarity, described in the context of separate examples, may also be provided in combination in a single example. Conversely, various features of the presently disclosed subject matter, which are, for brevity, described in the context of a single example, may also be provided separately or in any suitable sub-combination.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

All patents and patent applications mentioned in this specification are herein incorporated in their entirety by reference into the specification, to the same extent as if each individual patent or patent application was specifically and individually indicated to be incorporated herein by reference. In addition, citation or identification of any reference in this application shall not be construed as an admission that such reference is available as prior art to the present disclosure.

What is claimed is:

1. A lens system, comprising:
an image sensor having a sensor diagonal SD; and
a lens with a field of view FOV<80 degrees and having an f number f/#and N≥6 lens elements $L_1$-$L_N$ arranged along a lens optical axis OA starting with $L_1$ from an object side toward an image side, the lens having a pop-out total track length TTL<15 mm and a back focal length BFL in a pop-out state, and a collapsed total track length c-TTL in a collapsed state, wherein the lens system is configured to switch from the pop-out state to the collapsed state and vice versa by collapsing the BFL to a collapsed c-BFL, wherein a ratio c-TTL/TTL≤0.9, and wherein f/#≤1.8.

2. The lens system of claim 1, wherein f/#≤1.7.

3. The lens system of claim 1, wherein f/#≤1.6.

4. The lens system of claim 1, wherein f/#≤1.5.

5. The lens system of claim 1, wherein c-TTL/TTL≤0.8.

6. The lens system of claim 1, wherein SD≥12 mm.

7. The lens system of claim 1, wherein TTL 13 mm≤TTL≤14 mm.

8. The lens system of claim 1, wherein BFL>0.15×TTL.

9. The lens system of claim 1, wherein BFL>0.2×TTL.

10. The lens system of claim 1, wherein BFL>0.3×TTL.

11. The lens system of claim 1, wherein c-TTL/SD<0.9.

12. The lens system of claim 1, wherein c-TTL/SD<0.8.

13. The lens system of claim 1, wherein c-TTL/SD<0.7.

14. The lens system of claim 1, wherein all N lens elements are made of plastic.

15. The lens system of claim 1, wherein N=6.

16. The lens system of claim 15, wherein a sequence of lens powers from $L_1$ to $L_6$ is minus-plus-minus-plus-minus-plus.

17. The lens system of claim 1, wherein the lens system is included in a pop-out camera.

18. The lens system of claim 17, wherein the pop-out camera is included in a mobile device.

19. The lens system of claim 18, wherein the mobile device is a smartphone.

* * * * *